(12) United States Patent
Yun et al.

(10) Patent No.: US 8,263,252 B2
(45) Date of Patent: Sep. 11, 2012

(54) UNIT SET HAVING A PLURALITY OF LITHIUM RECHARGEABLE BATTERIES AND A SET HAVING A PLURALITY OF THE UNIT SETS

(75) Inventors: Jungsik Yun, Daejeon (KR); Suyoung Chang, Daejeon (KR); Seungjun Lee, Daejeon (KR); Jeonkeun Oh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 223 days.

(21) Appl. No.: 12/740,165

(22) PCT Filed: Sep. 24, 2008

(86) PCT No.: PCT/KR2008/005659
§ 371 (c)(1),
(2), (4) Date: Aug. 25, 2010

(87) PCT Pub. No.: WO2009/057894
PCT Pub. Date: May 7, 2009

(65) Prior Publication Data
US 2010/0310909 A1    Dec. 9, 2010

(30) Foreign Application Priority Data

Oct. 29, 2007  (KR) ........................ 10-2007-0108791
Jul. 21, 2008  (KR) ........................ 10-2008-0070542

(51) Int. Cl.
*H01M 2/26*    (2006.01)
*H01M 10/48*   (2006.01)
*H01M 10/50*   (2006.01)

(52) U.S. Cl. .......... 429/158; 429/90; 429/120; 429/159; 429/160

(58) Field of Classification Search .................. None
See application file for complete search history.

(56) References Cited

U.S. PATENT DOCUMENTS

| | | | |
|---|---|---|---|
| 7,074,517 B2 * | 7/2006 | Higashino ........................ 429/66 |
| 7,914,922 B2 * | 3/2011 | Sanada et al. .................. 429/152 |
| 2005/0014036 A1 | 1/2005 | Kim |
| 2007/0072066 A1 | 3/2007 | Yoon et al. |
| 2008/0160400 A1 | 7/2008 | Oh |
| 2008/0193838 A1 | 8/2008 | Oh |
| 2008/0299449 A1 | 12/2008 | Yun et al. |
| 2010/0196753 A1 * | 8/2010 | Heo et al. ........................ 429/158 |

FOREIGN PATENT DOCUMENTS

| | | |
|---|---|---|
| KR | 20050000594 A | 1/2005 |
| KR | 20060102207 A | 9/2006 |
| KR | 20060102208 A | 9/2006 |
| KR | 20070073610 A | 7/2007 |

\* cited by examiner

*Primary Examiner* — John S Maples
(74) *Attorney, Agent, or Firm* — The Webb Law Firm

(57) ABSTRACT

The present invention relates to a unit set having a plurality of lithium rechargeable batteries, which can receive and protect a plurality of lithium rechargeable batteries comprised of an pouch and an electrode tap and facilely change a voltage and a capacity thereof according to a degree of freedom in a stack structure of the lithium rechargeable batteries, and a set having a plurality of the unit sets.

16 Claims, 23 Drawing Sheets

[Figure 1]
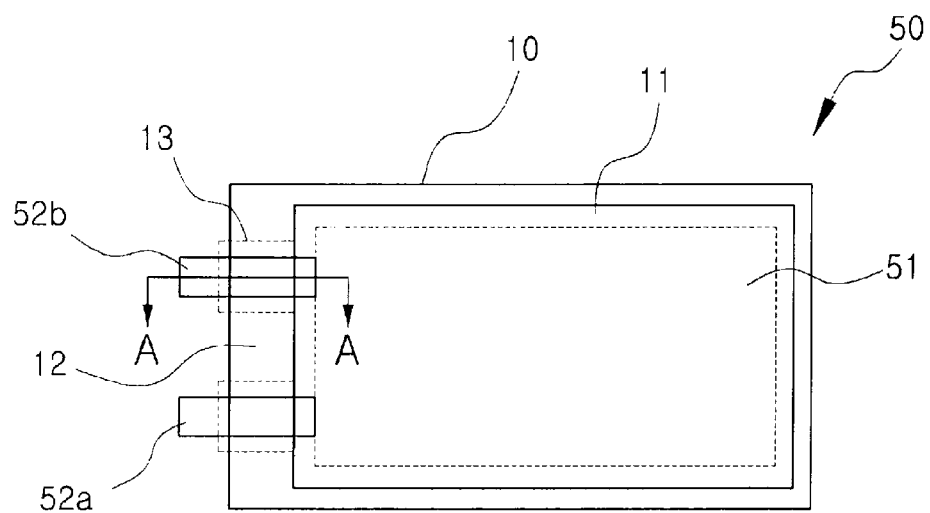
[Figure 2]
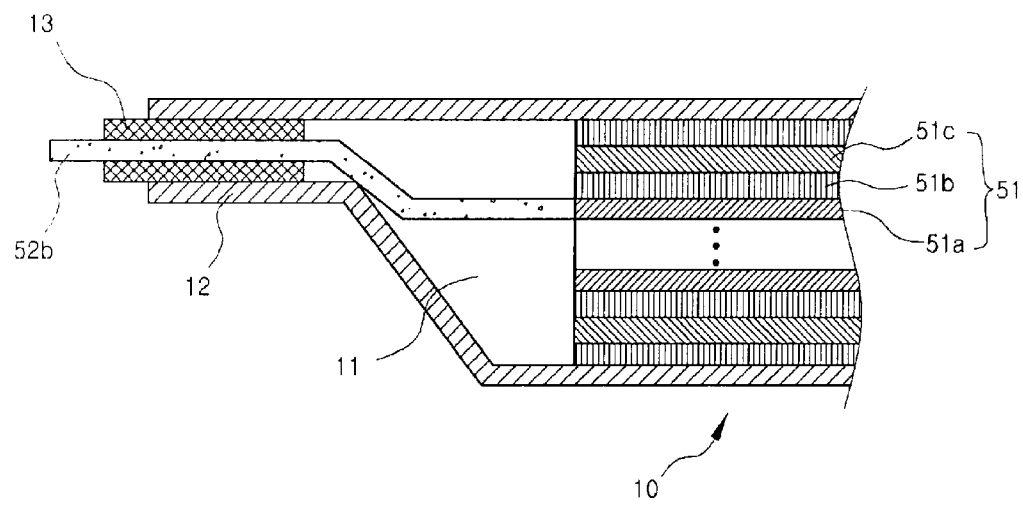

[Figure 3]
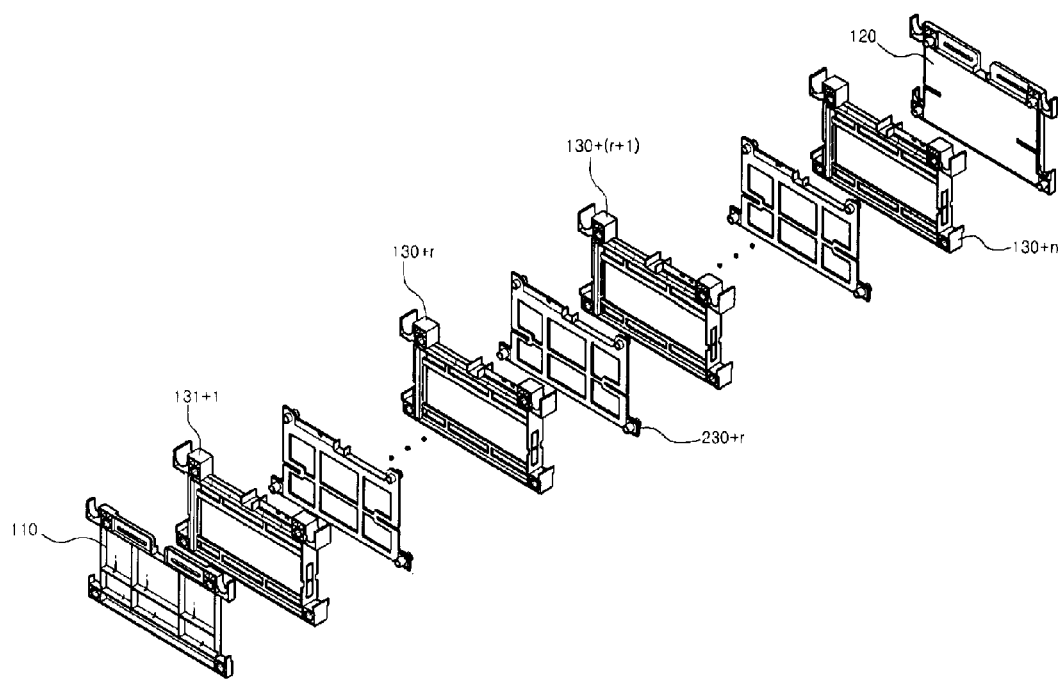

[Figure 4]
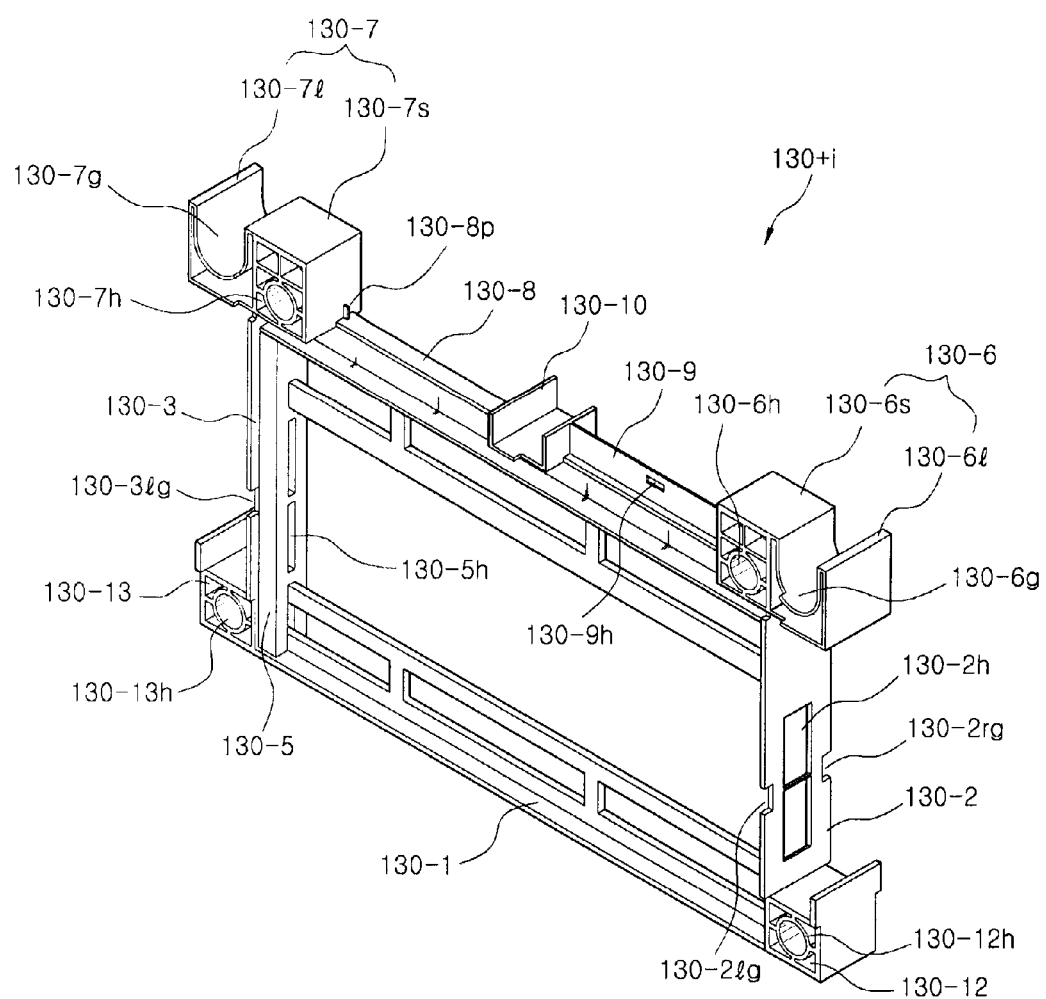

[Figure 5]
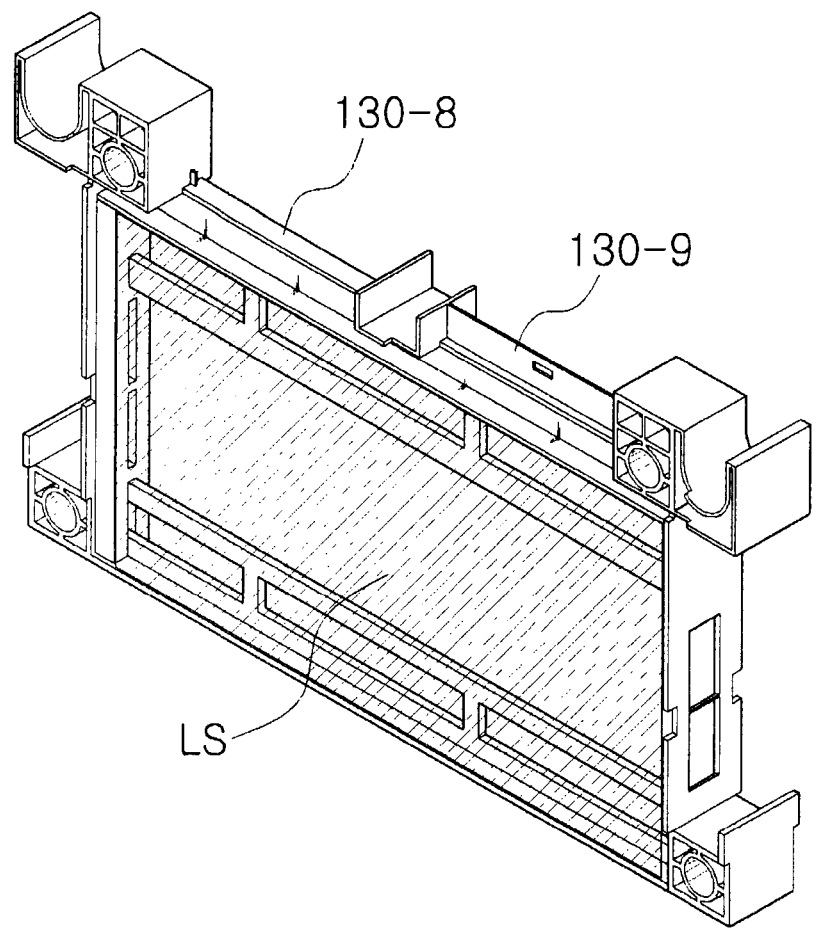

[Figure 6]
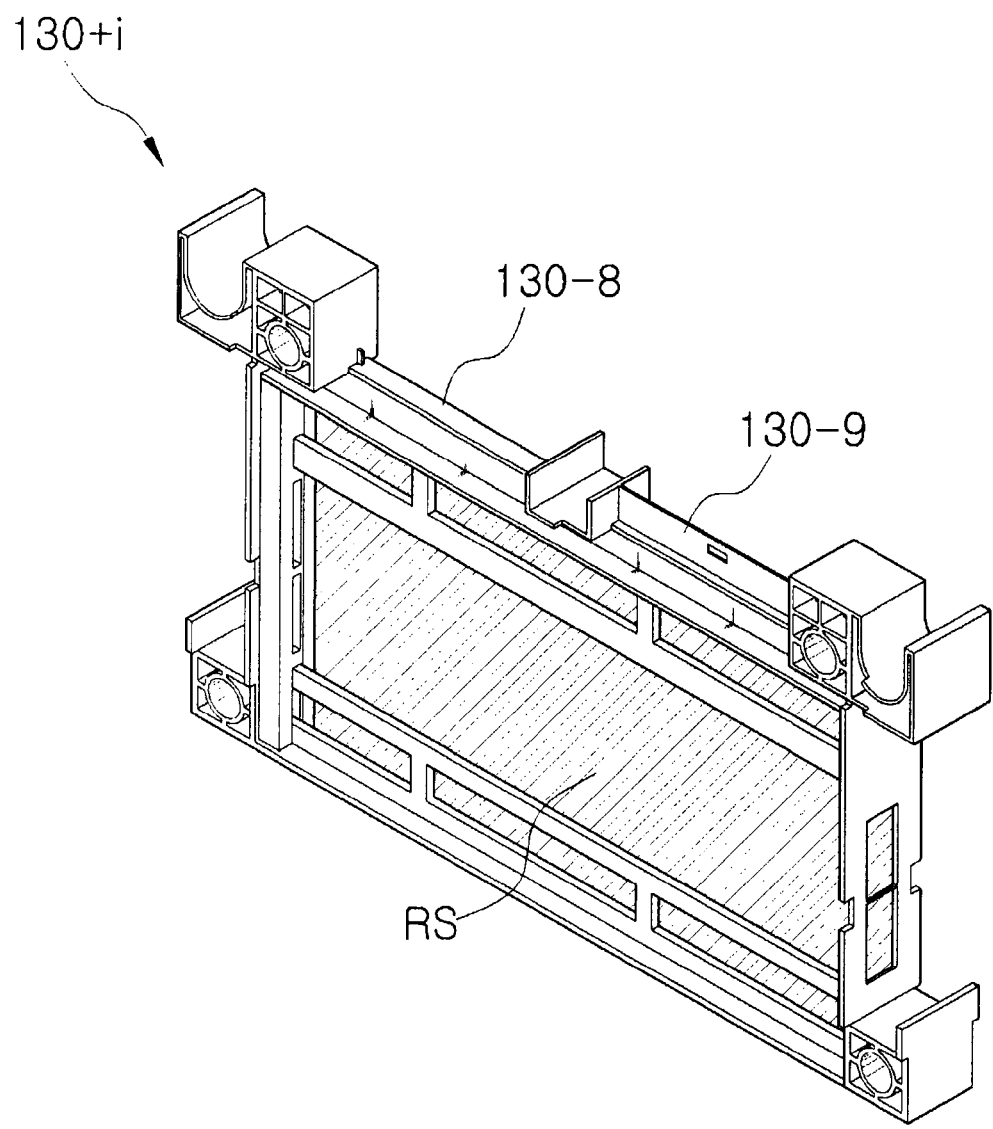

[Figure 7]
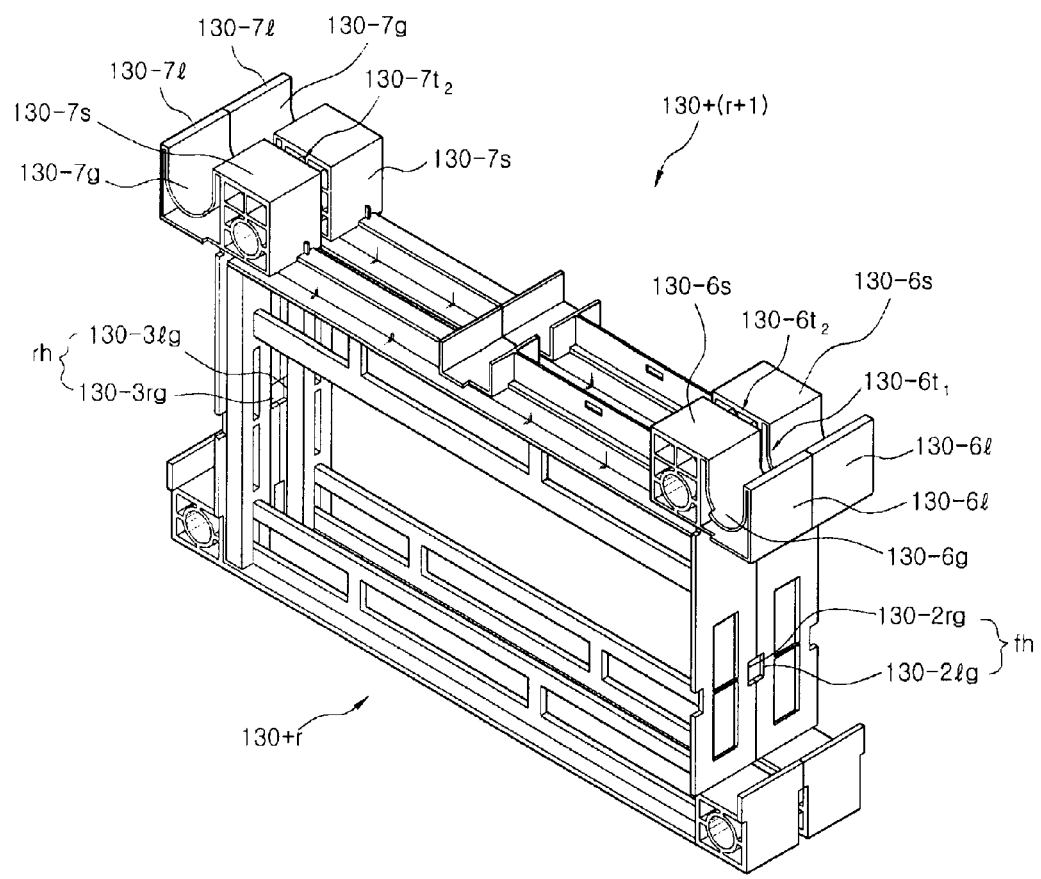

[Figure 8]
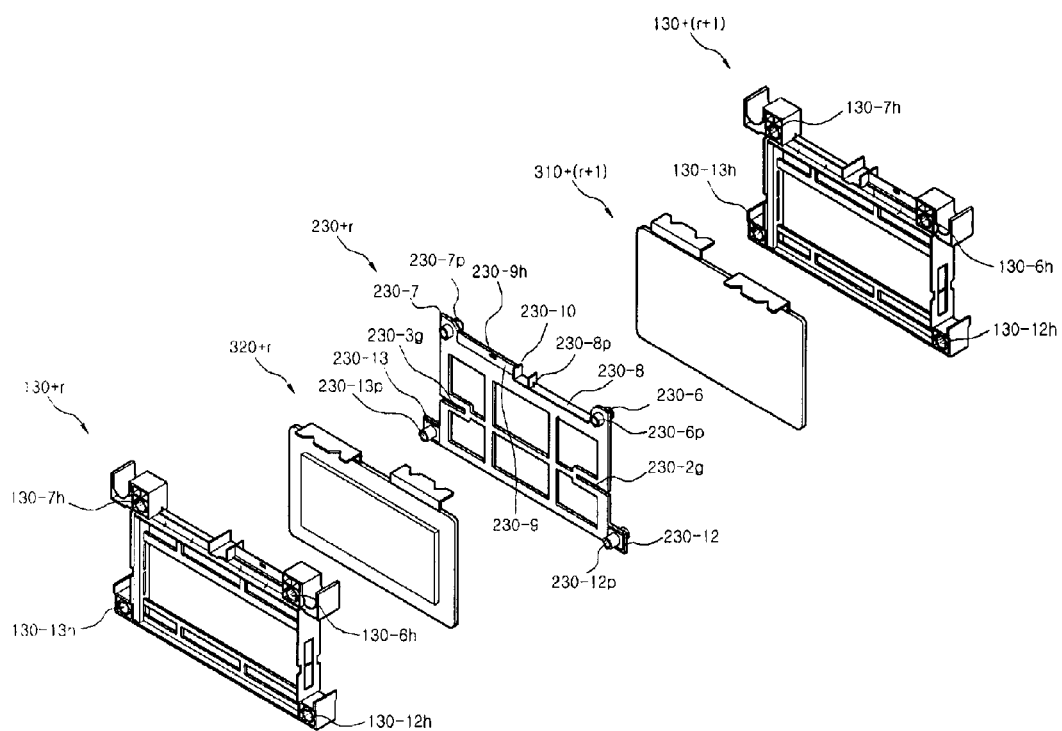

[Figure 9]
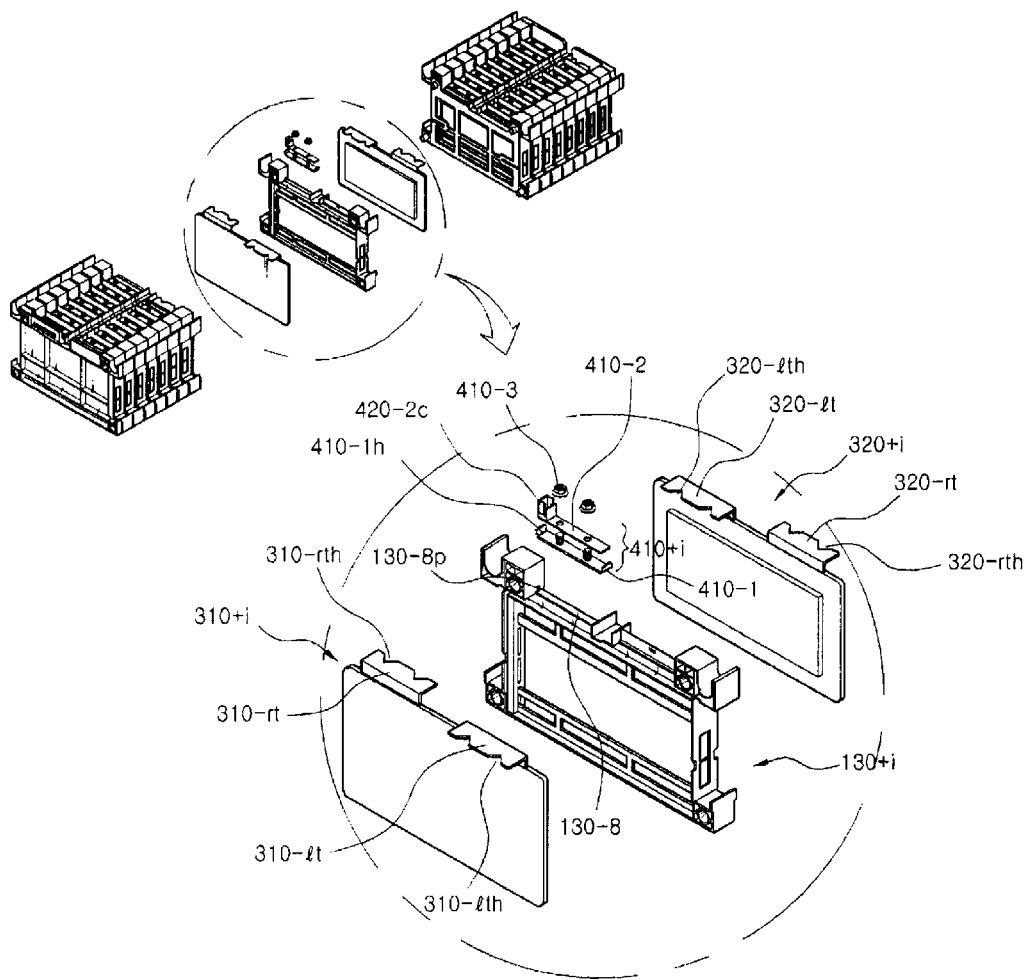

[Figure 10]
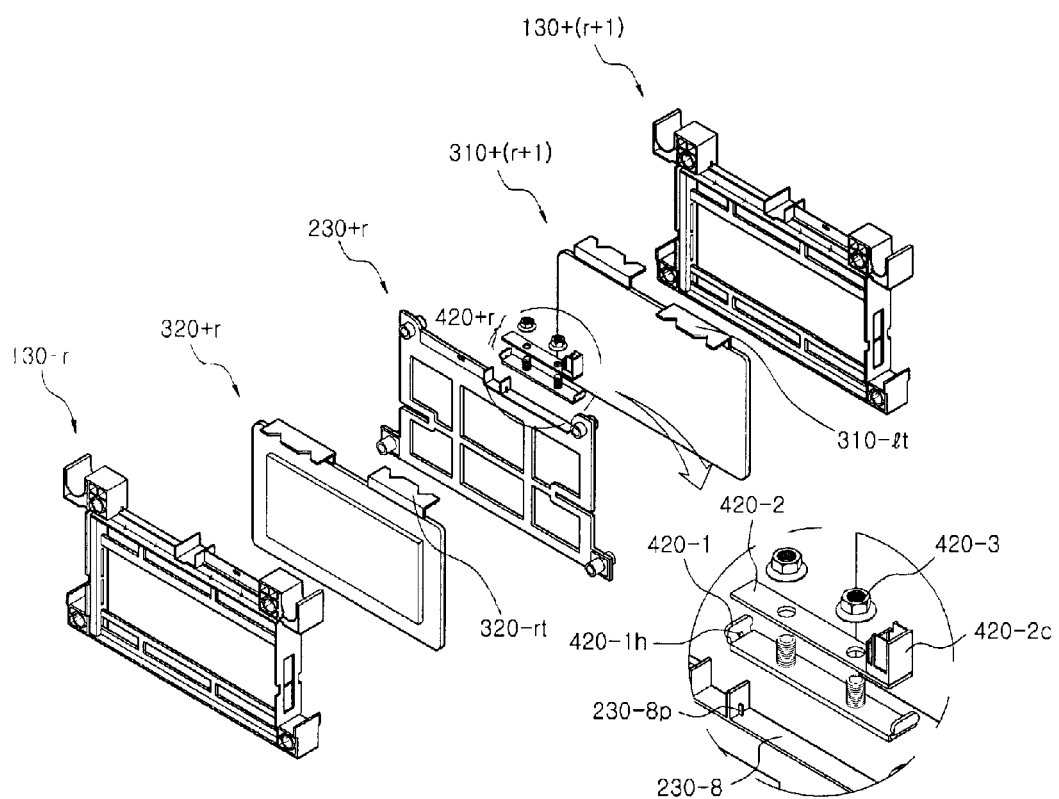

[Figure 11]
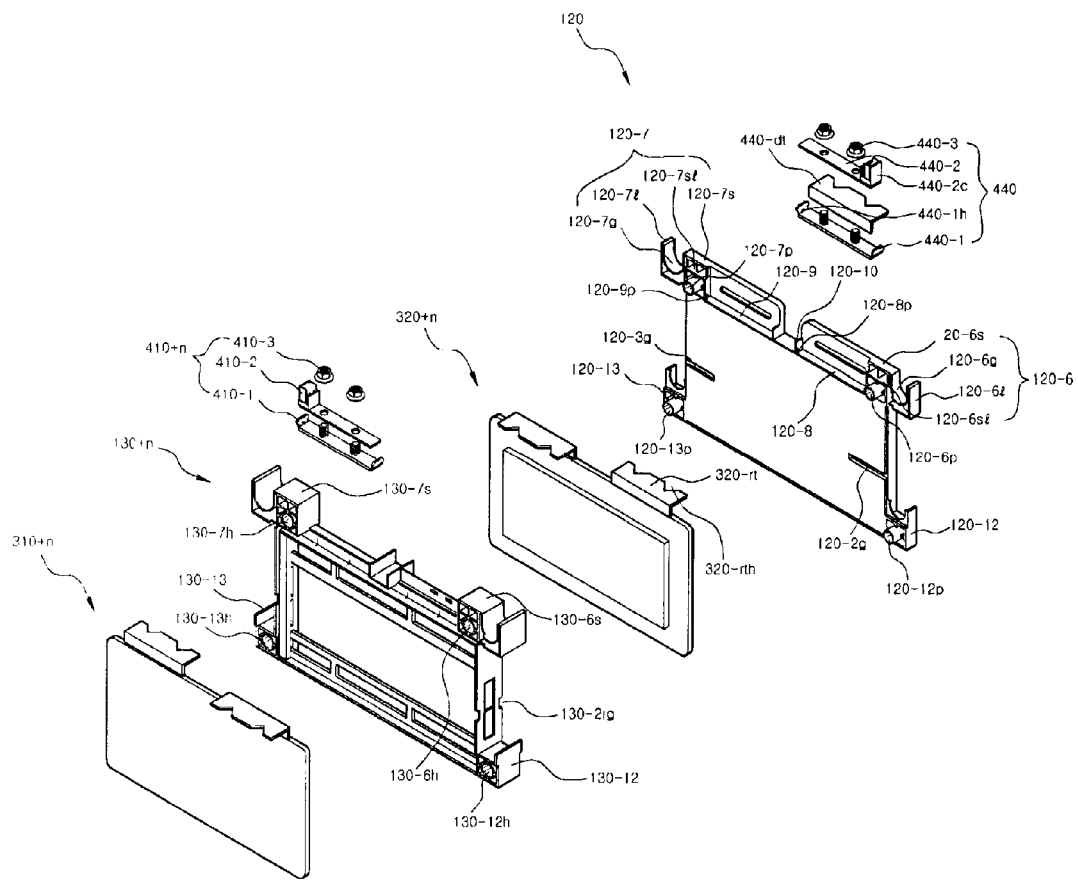

[Figure 12]
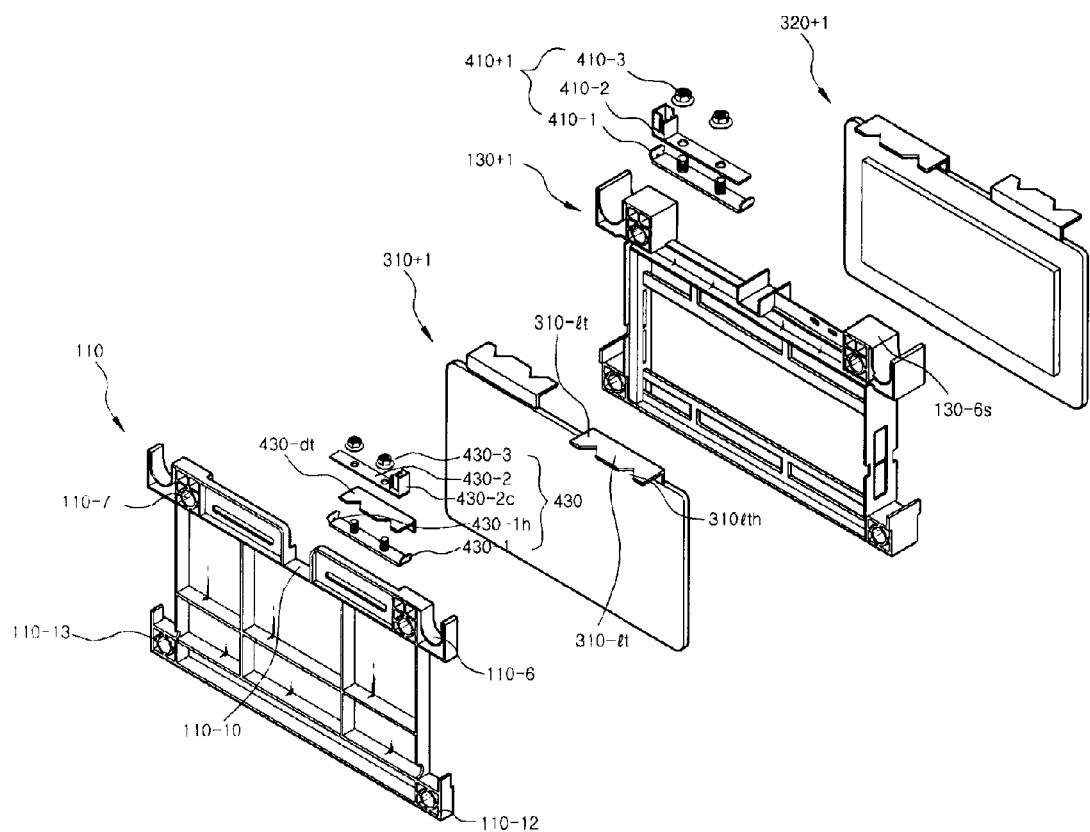

[Figure 13]
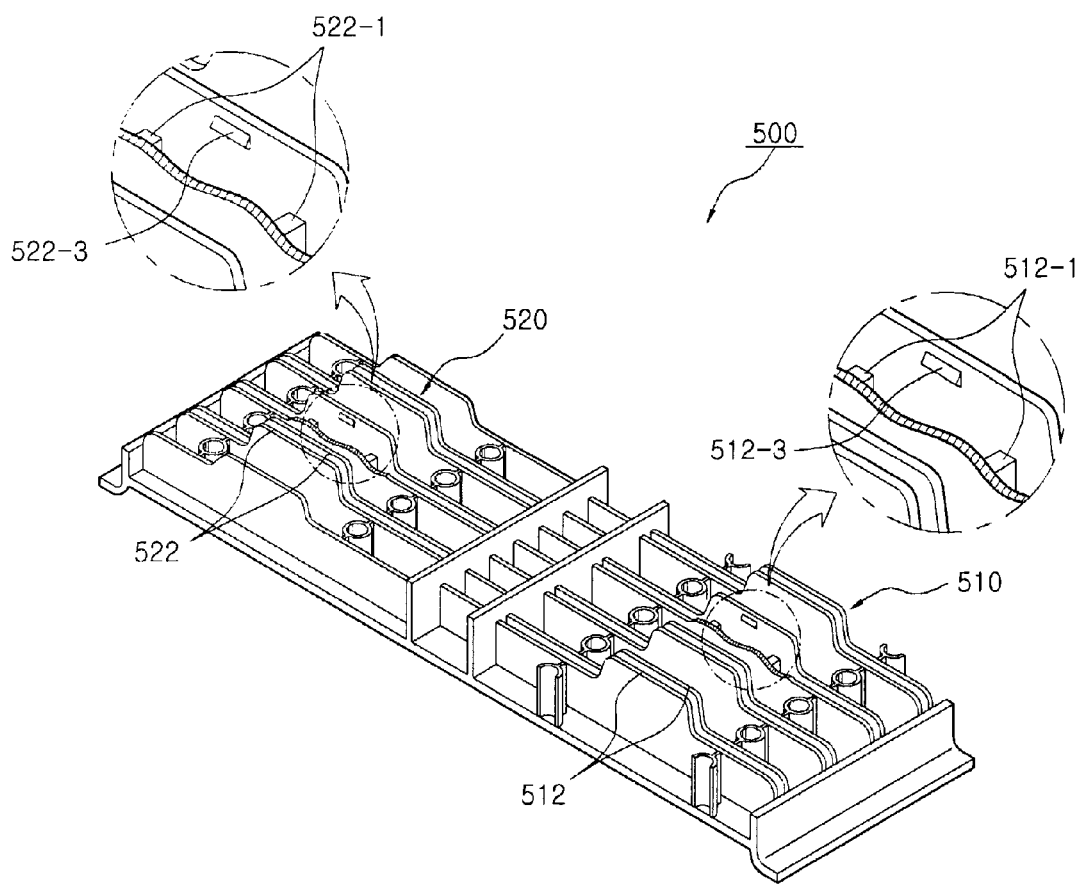

[Figure 14]
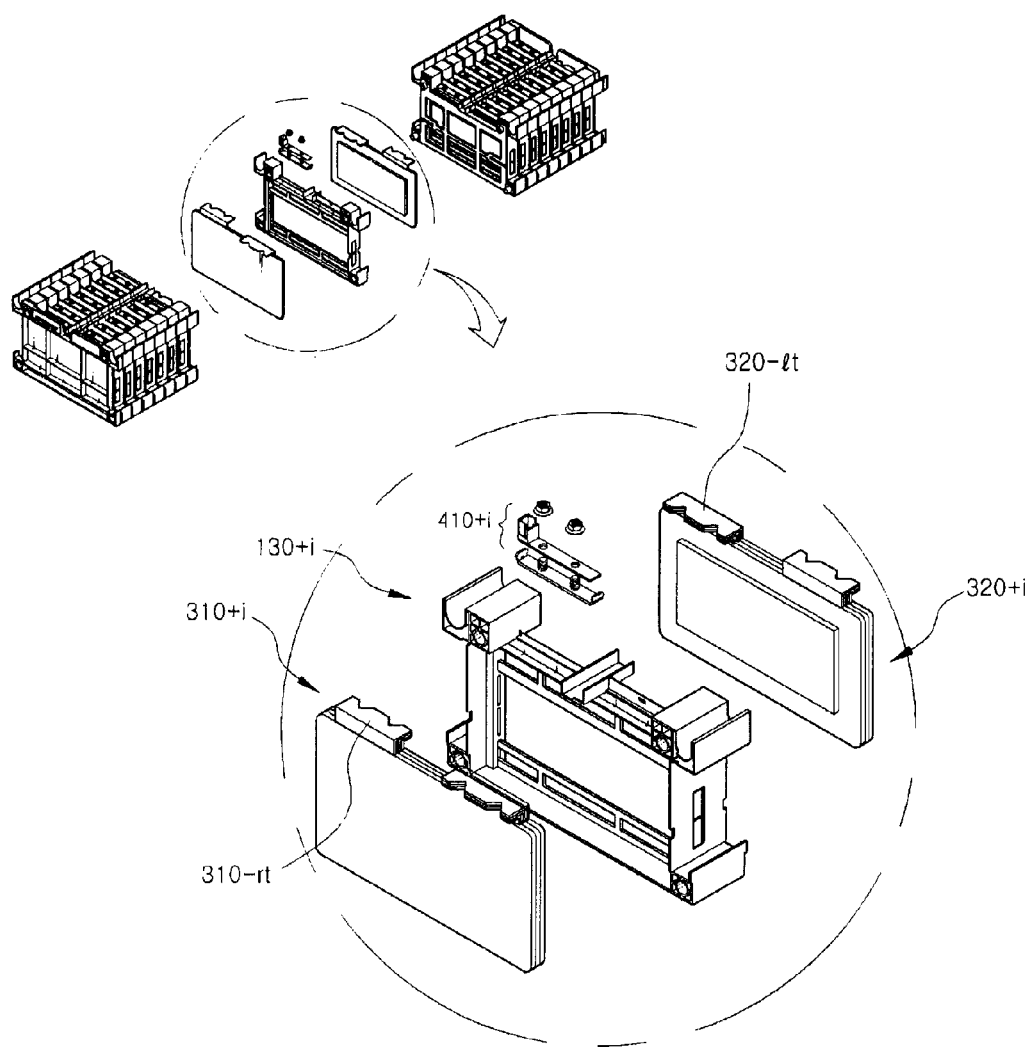

[Figure 15]
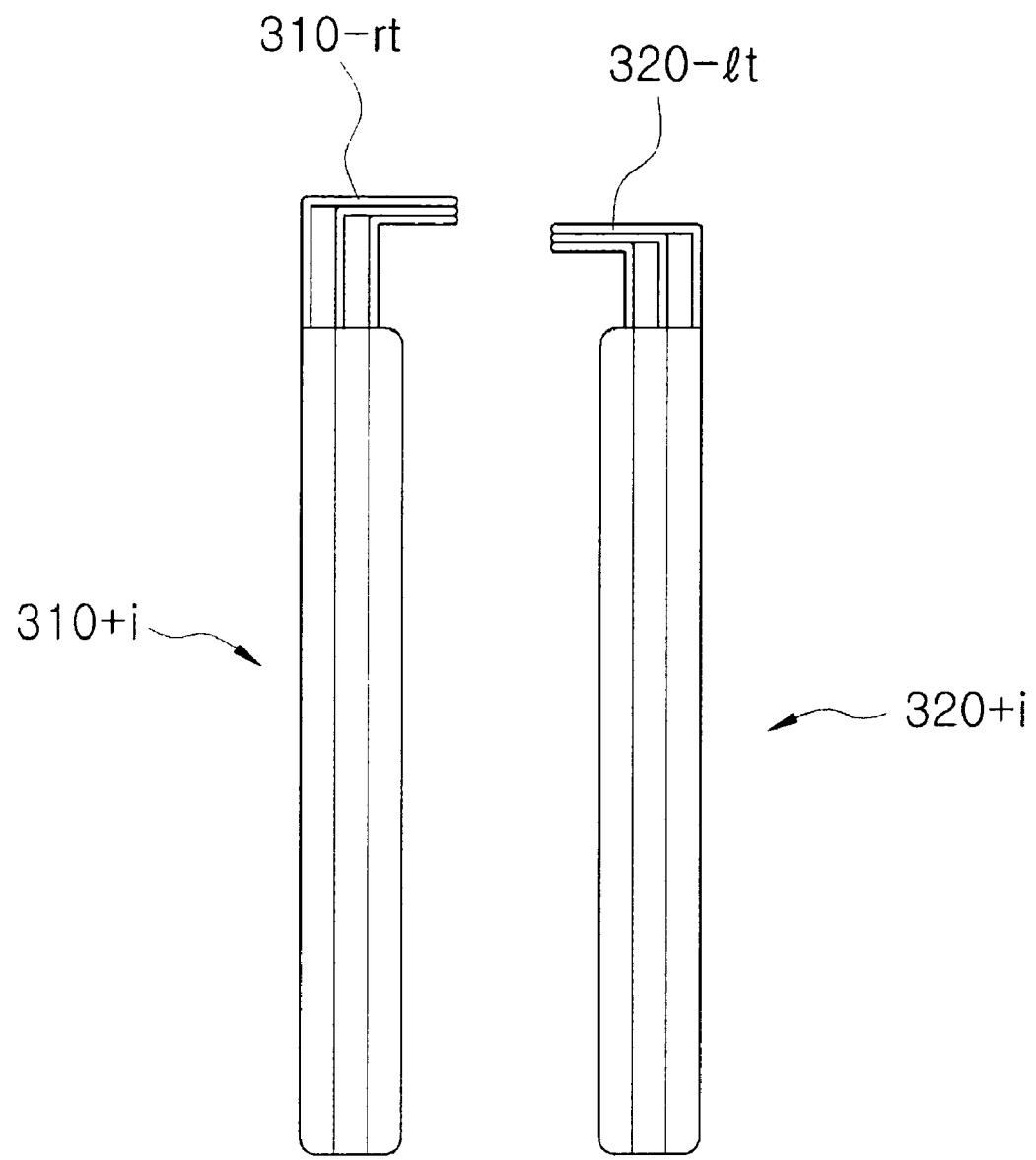

[Figure 16]
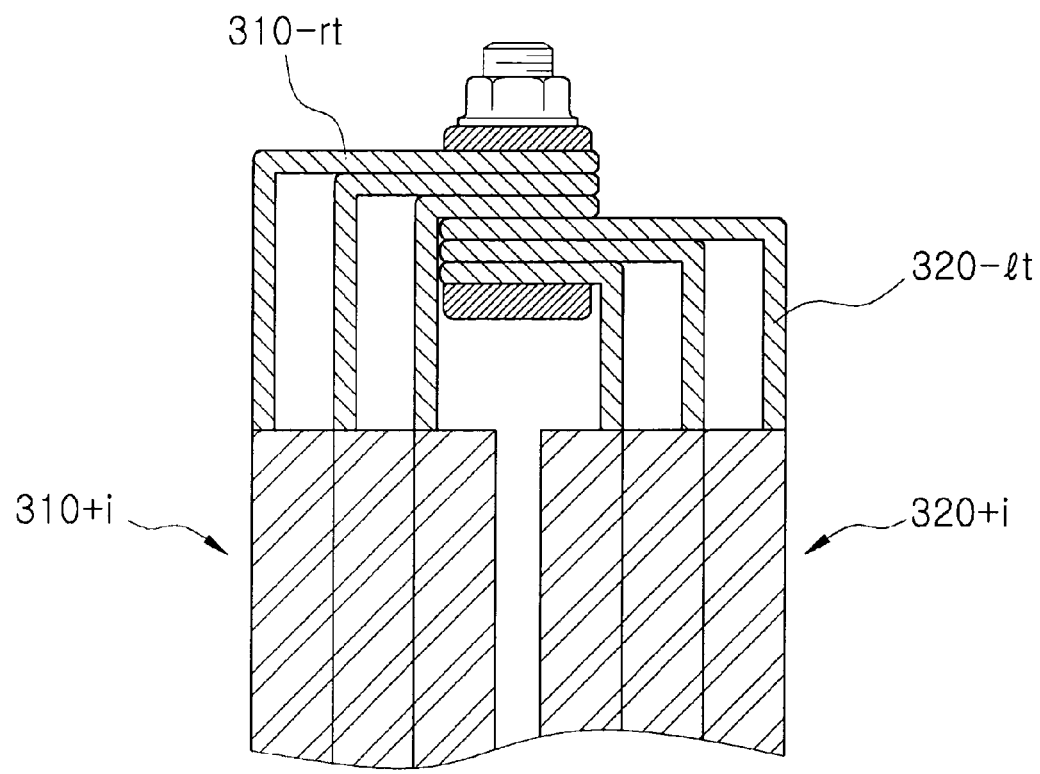

[Figure 17]
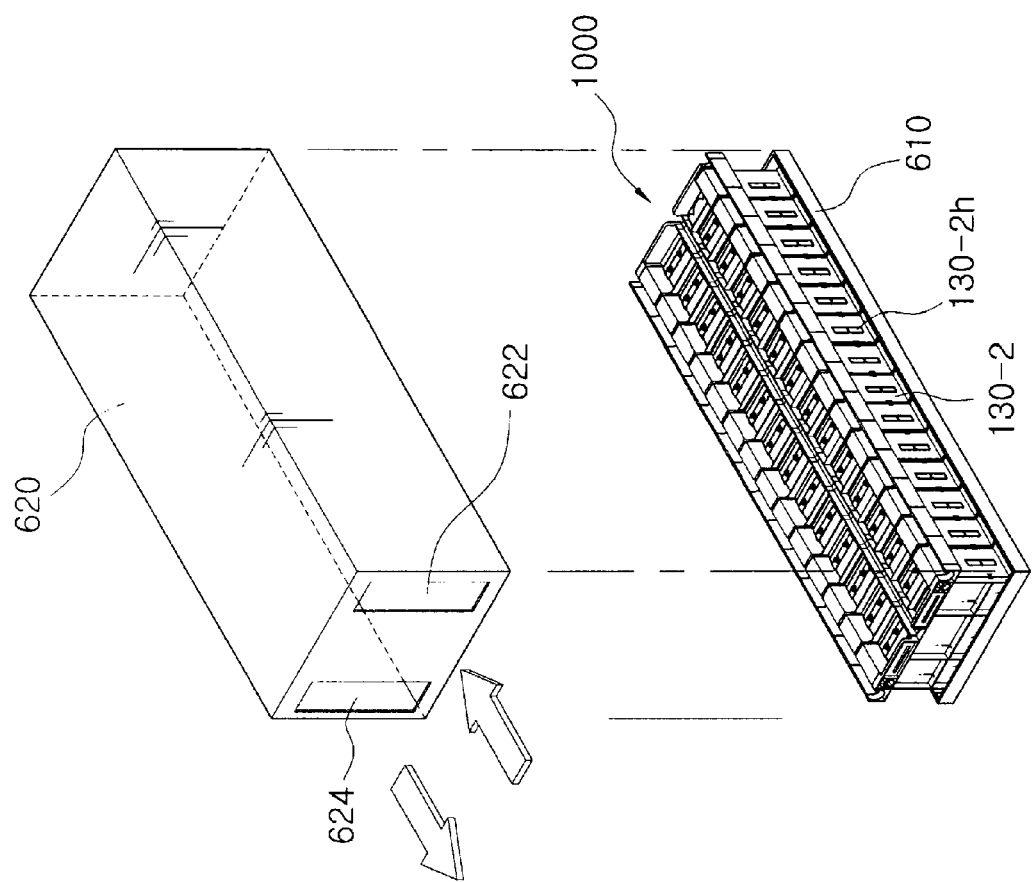

[Figure 18]
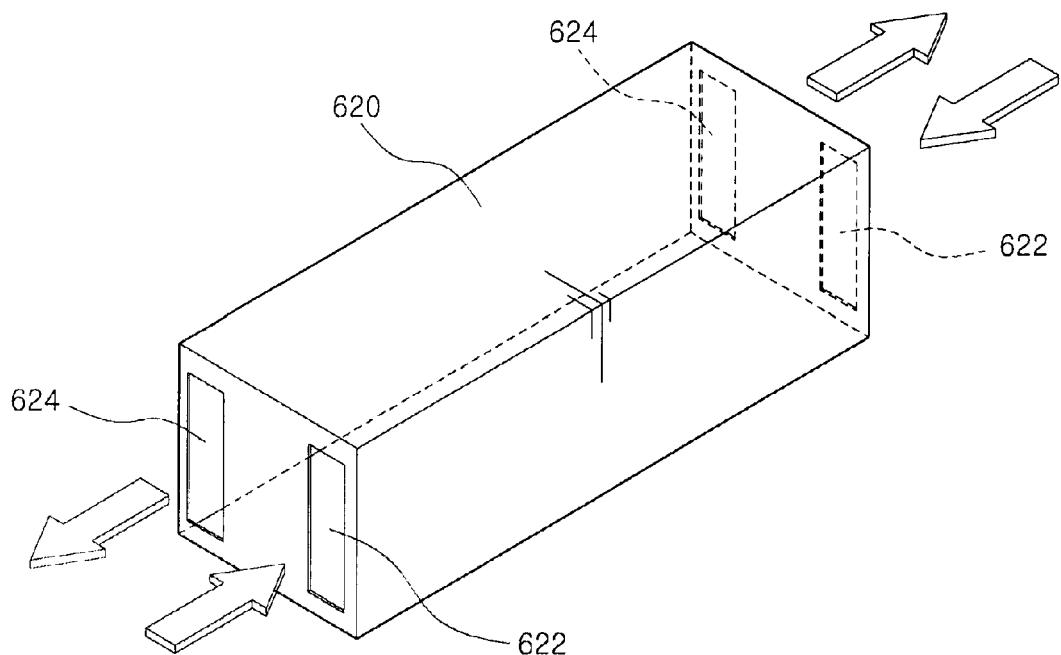

[Figure 19]
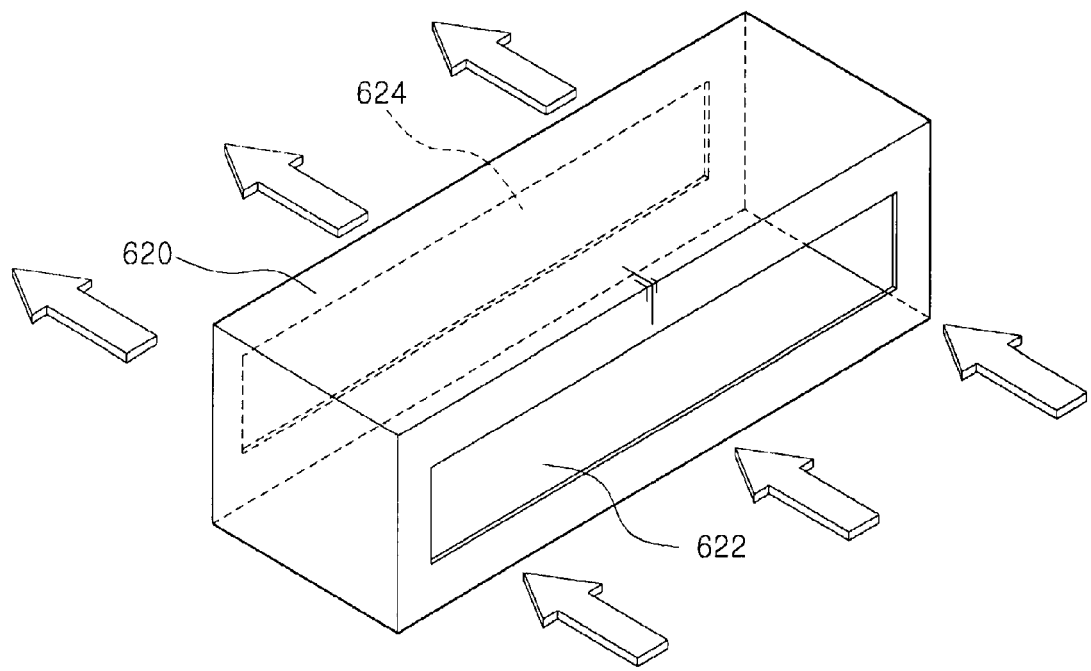

[Figure 20]
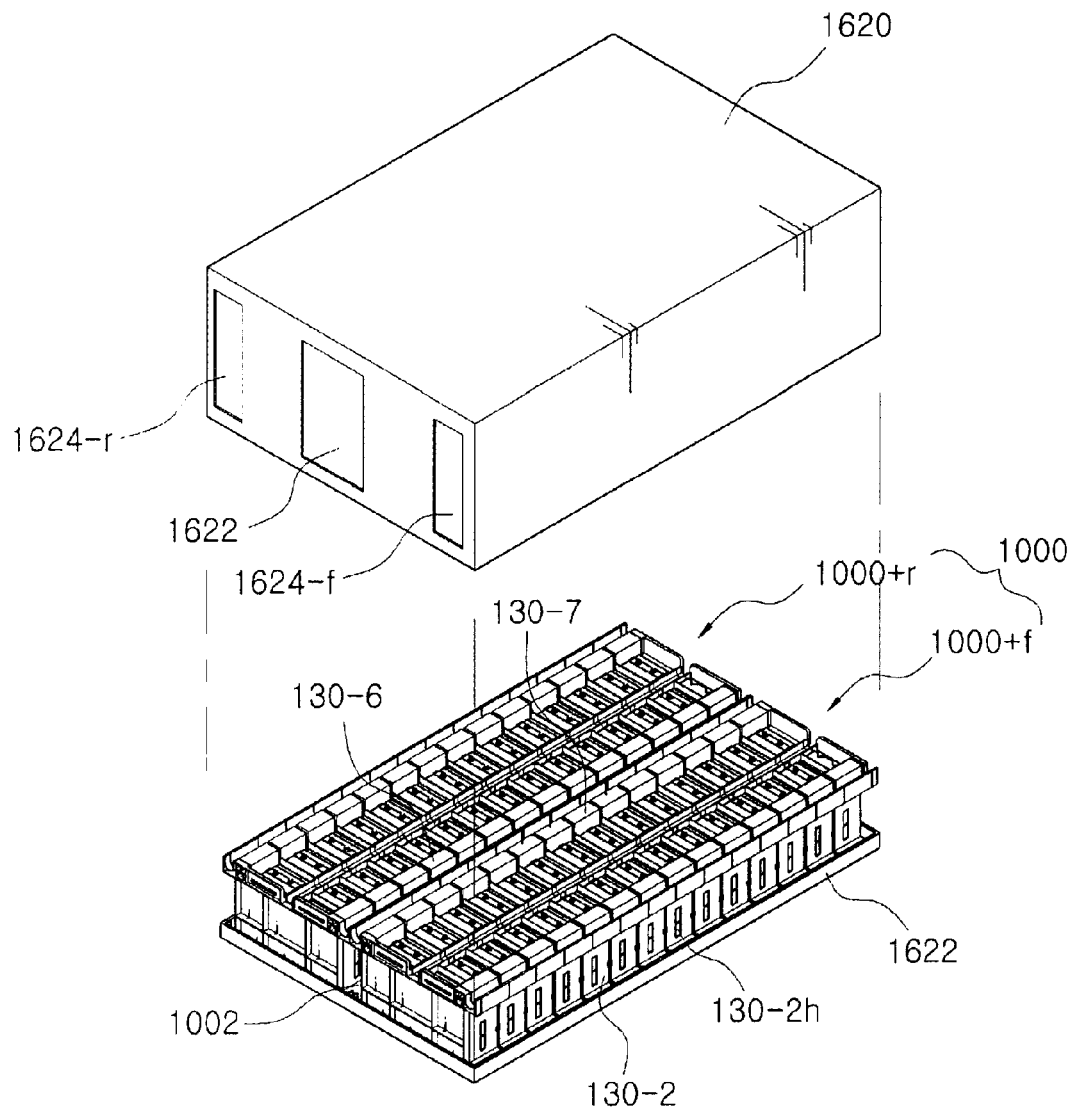

[Figure 21]
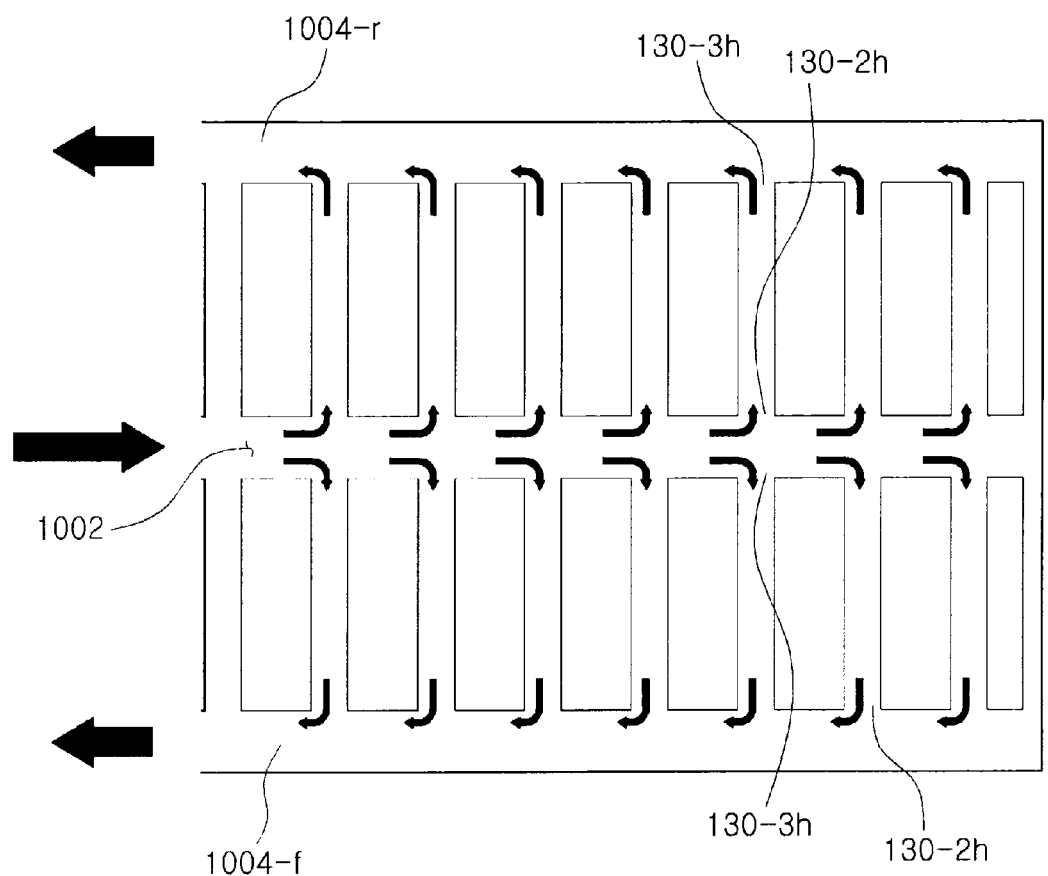

[Figure 22]
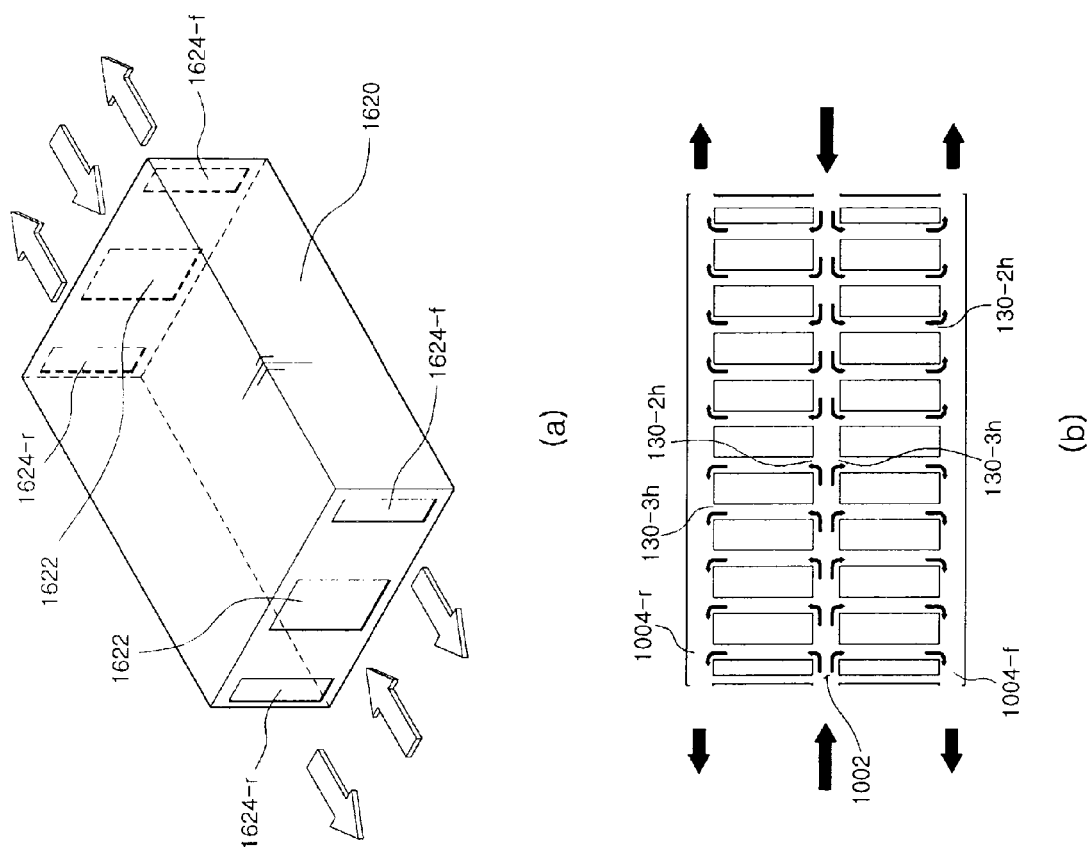

[Figure 23]
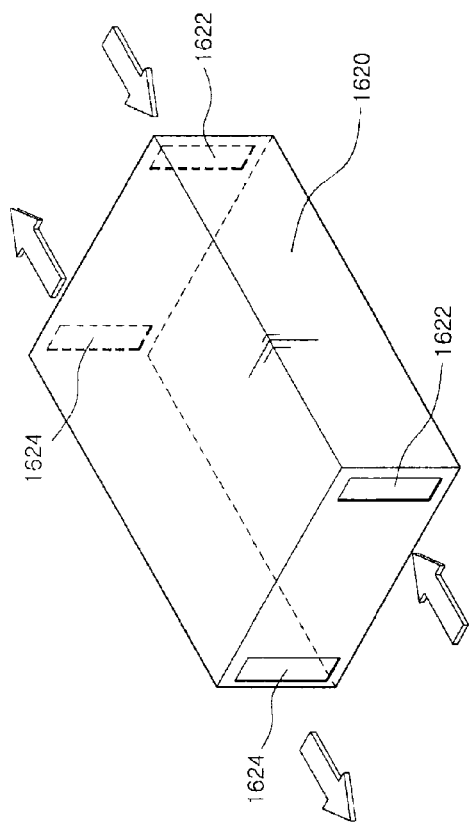 (a)
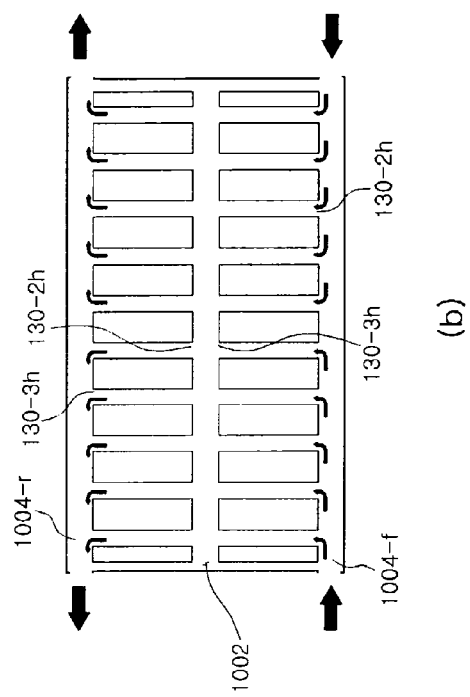 (b)

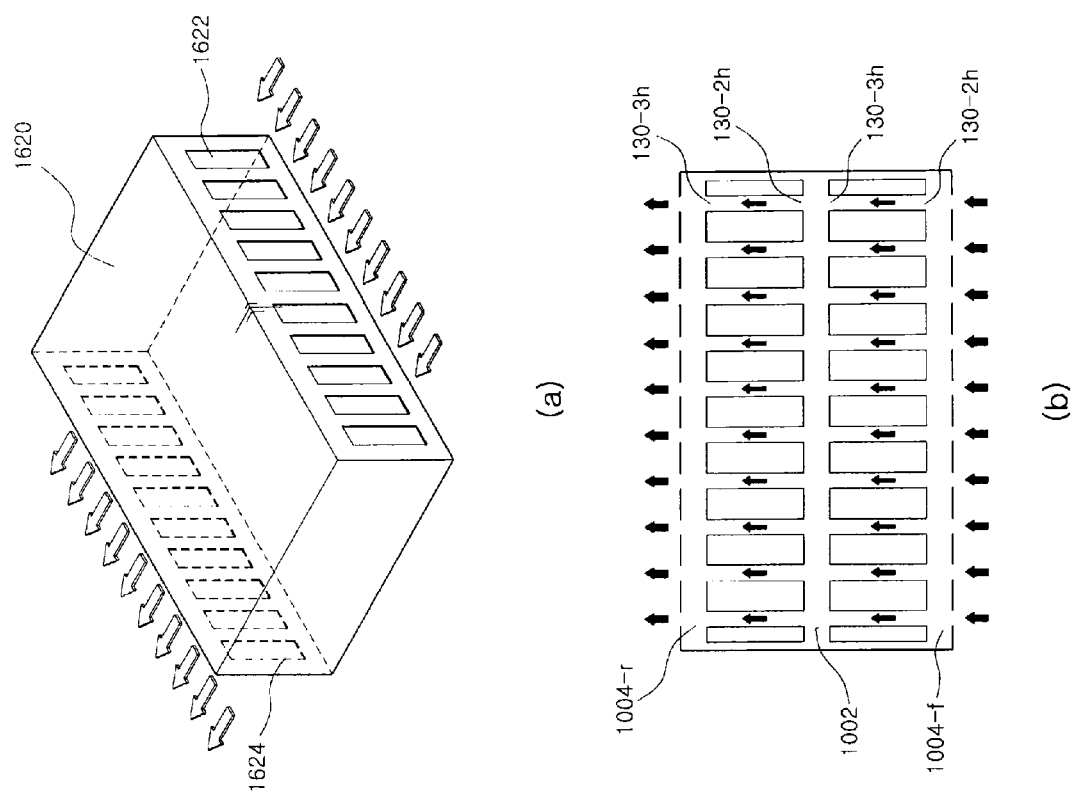
[Figure 24]

UNIT SET HAVING A PLURALITY OF LITHIUM RECHARGEABLE BATTERIES AND A SET HAVING A PLURALITY OF THE UNIT SETS

TECHNICAL FIELD

The present invention relates to a unit set having a plurality of lithium rechargeable batteries and a set having a plurality of the unit sets, and more particularly, to a unit set having a plurality of lithium rechargeable batteries, which can receive and protect a plurality of lithium rechargeable batteries comprised of an pouch and an electrode tap and facilely change a voltage and a capacity thereof according to a degree of freedom in a stack structure of the lithium rechargeable batteries, and a set having a plurality of the unit sets.

BACKGROUND ART

In generally, a secondary battery capable of repeating charge/discharge, unlike a primary battery, has been developed according to the development of high-tech products, such as a digital camera, a cellular phone, a notebook computer, a hybrid vehicle. The secondary battery includes a Ni—Cd battery, a Ni-metal hybrid battery, a Ni—H battery, a lithium rechargeable battery and the like. The lithium rechargeable battery having an operating voltage of 3.6 V or more is used as a power source for various portable electronic instruments, or a plurality of lithium rechargeable batteries are connected in series and used in a high power hybrid vehicle. Since the lithium rechargeable battery has the operating voltage that is three times higher than that of the Ni—Cd battery or the Ni-metal hybrid battery and also has excellent characteristic of energy density per unit weight, its use is sharply increased.

The lithium rechargeable battery can be manufactured in various types, e.g., a cylinder type and a prismatic type which are mainly used in a lithium-ion battery. Recently, a lithium polymer battery is manufacture in a pouched type having flexibility, and thus it can be freely formed into various shapes. Further, since the lithium polymer battery is light and has excellent stability, it is advantageous in forming much slimmer and lighter portable electronic instruments.

FIG. 1 is a view showing a structure of a conventional pouched type lithium rechargeable battery. The conventional pouched type lithium rechargeable battery includes a battery part 51, and a case 10 that provides a space 11 for receiving the battery part 51.

In the battery part 51, an anode plate, a separator and a cathode plate are arranged in turn and then wound in one direction, or a plurality of anode plates, separators and cathode plates are stacked. Each electrode plate of the battery part 51 is electrically connected with an anode tap 52a and a cathode tap 52b.

One ends of the anode tap 52a and the cathode tap 52b are protruded through a closed surface 12 of the case 10 to the outside. The protruded ends of the anode tap 52a and the cathode tap 52b are connected with a terminal of a protection circuit board.

An isolating tape is wound on the anode tap 52a and the cathode tap 52b to prevent electrical short between the case 10 and the anode tap 52a and the cathode tap 52b at a portion contacted with the closed surface 12.

The case 10 has a pouched type structure including a middle layer formed of a metal foil and inside and outside layers formed of an insulation film, unlike a can type structure such as a cylinder type or a prismatic type that is thickly formed of a metallic material. The pouched type case has excellent formability and flexibility. The case 10 is formed with the space 11 for receiving the battery part 51, as described above, and the closed surface 12 is thermally bonded along an edge of the space 11.

FIG. 2 is a cross-sectional view taken along a line A-A of FIG. 1. The case 10 is formed of a complex film including a middle layer formed of a metal foil, e.g., an aluminum foil and inside and outside layers formed an insulation film that is attached to inner and outer surfaces of the middle layer so as to protect the middle layer.

The battery part 51 in which an anode plate 51a, a separator 51c and a cathode plate 51b are arranged in turn is received in the space 11 of the case 10, and the anode tap 52a and the cathode tap 52b are extended from the anode plate 51a and the cathode plate 51b. Ends of the extended electrode taps 52a and 52b are protruded through the closed surface 12 of the case to the outside, and outer surfaces of the electrode taps 52a and 52b that are contacted with the closed surface 12 are wound with an insulating tape 13.

In a pouched type lithium rechargeable battery 50, as described above, the battery part 51 is finished by electrically connecting the electrode taps 52a and 52b and the anode plate 51a and the cathode plate 51b and then winding them in one direction in the status that the anode plate 51a, the separator 51c and the cathode plate 51b are arranged in turn.

The finished battery part 51 is installed in the space 11 of the case 10 through a drawing process. One end of each electrode tap 52a, 52b is exposed to the outside of the case 10 upon the installing. In this situation, the pouched type lithium rechargeable battery 50 is finished by a thermal bonding process that applies predetermined heat and pressure to the closed 11 of the case 10. In order to stabilize the battery structure, the finished pouched type lithium rechargeable battery 50 is treated by a formation process including charging, aging, discharging and the like, thereby determining whether the battery is normal or abnormal.

Along this line, Korean Patent Publication No. 2005-000594 discloses a method casing a pouched type lithium rechargeable battery. In this pouched type lithium rechargeable battery, as the same anode potential is applied to an anode tap and a metal layer of a case, when a cathode tap is contacted with a metal layer of the case due to breakage of an inside layer of the case, electrical short is induced so as to easily detect voltage difference of an open circuit.

Meanwhile, in case that a high-power lithium battery is necessary for the hybrid vehicle, a few tens to a few hundreds pouches are stacked and then connected to each other in series so as to obtain a high voltage.

Since the pouched type lithium polymer battery is formed of a flexible aluminum pouch which can be easily bent, it has to be protected by a hard case to be used for a long time. However, in the conventional battery, the anode tap and the cathode tap of each pouch are connected by a printed circuit board (PCB) having a circuit pattern in order to connect the plurality of pouches in series, and then the connected pouches are received in the case.

However, in the conventional method of forming a high power lithium battery by stacking the plurality of lithium polymer pouches, since the flexible lithium polymer pouch cannot be protected completely and securely and the method of connecting the stacked pouches using the PCB is also imperfect, it cannot resist an environment change.

Therefore, there is required a method of securely and stably stacking the pouch units forming the high power lithium battery as a power source and then connecting them in series or parallel.

DISCLOSURE

Technical Problem

Therefore, an object of the present invention is to provide a unit set having a plurality of lithium rechargeable batteries, in which the plurality of lithium rechargeable batteries can be received more securely and stably.

Another object of the present invention is to provide a unit set having a plurality of lithium rechargeable batteries, in which the plurality of lithium rechargeable batteries can be directly connected to each other without a separate connecting device and also can freely change a voltage and a capacity of the connected lithium rechargeable batteries.

Yet another object of the present invention is to provide a unit set having a plurality of lithium rechargeable batteries, which can prevent overheat upon charge/discharge of the connected lithium rechargeable batteries.

Yet another object of the present invention is to provide a set having a plurality of the unit sets.

Technical Solution

To achieve the object, the present invention provides a unit set having a plurality of lithium rechargeable batteries, comprising a left end frame and a right end frame; a plurality of main frames which are arranged to be adjacent to each other between the left end frame and the right end frame, and which respectively have a first tap supporting portion formed at an upper end thereof to be exposed, a left space portion formed at a lower left side of the first tap supporting portion to be opened and a right space portion formed at a lower right side of the first tap supporting portion to be opened; a center frame which has a first tap supporting portion formed at an upper end thereof to be exposed, and of which a left side is coupled to a left main frame and a right side is coupled to a right main frame so as to be disposed between the right space portion of the left main frame and the left space portion of the right main frame of the two adjacent main frames; a first type lithium rechargeable battery which is formed with a left electrode tap bent to a left side of an outer circumferential surface of a pouch and a right electrode tap bent to a right side of the outer circumferential surface of the pouch and which is received in the left space portion of each main frame; a second type lithium rechargeable battery of which a left electrode tap having an opposite polarity of the right electrode tap of the first type lithium rechargeable battery is protruded in a direction opposed to the right electrode tap of the first type lithium rechargeable battery and a right electrode tap having an opposite polarity of the left electrode tap of the first type lithium rechargeable battery is protruded in a direction opposed to the left electrode tap of the first type lithium rechargeable battery, and which is received in the right space portion of each main frame; a first connecting means which is provided with a first lower fixing plate having a bolt protruded upward, a first upper fixing plate through which the bolt of the first lower fixing plate passes and a first coupling unit installed to an end of the bolt of the first lower fixing plate passing through the first upper fixing plate, and which is disposed at the first tap supporting portion; and a second connecting means which is provided with a second lower fixing plate having a bolt protruded upward, a second upper fixing plate through which the bolt of the second lower fixing plate passes and a second coupling unit installed to an end of the bolt of the second lower fixing plate passing through the second upper fixing plate, and which is disposed at the second tap supporting portion, wherein the right electrode tap of the first type lithium rechargeable battery and the left electrode tap of the second type lithium rechargeable battery received in one of the main frames are fixedly and electrically connected to each other in series by the first connecting means, and the right electrode tap of the second type lithium rechargeable battery received in the left main frame and the left electrode tap of the first type lithium rechargeable battery received in the right main frame of the two adjacent main frames are fixedly and electrically connected to each other in series by the second connecting means.

Preferably, n first type lithium rechargeable batteries are received in the left space portion of each main frame to be electrically connected to each other in parallel, and n second type lithium rechargeable batteries are received in the right space portion of each main frame to be electrically connected to each other in parallel, where n is a natural number that is equal to and larger more than 2. Left electrode taps and right electrode taps of the n first type lithium rechargeable batteries received in the left space portion of each main frame are stacked up and down to be electrically connected to each other in parallel, and left electrode taps and right electrode taps of n second type lithium rechargeable batteries received in the right space portion of each main frame are stacked up and down to be electrically connected to each other in parallel.

Preferably, the left end frame has a third tap supporting portion formed an upper end thereof to be exposed and is coupled to a leftmost main frame of the main frames, the right end frame has a fourth tap supporting portion formed an upper end thereof to be exposed and is coupled to a rightmost main frame of the main frames, a third connecting means which is provided with a third lower fixing plate having a bolt protruded upward, a third upper fixing plate through which the bolt of the third lower fixing plate passes and a third coupling unit installed to an end of the bolt of the third lower fixing plate passing through the third upper fixing plate is disposed at the third tap supporting portion, a fourth connecting means which is provided with a fourth lower fixing plate having a bolt protruded upward, a fourth upper fixing plate through which the bolt of the fourth lower fixing plate passes and a fourth coupling unit installed to an end of the bolt of the fourth lower fixing plate passing through the fourth upper fixing plate is disposed at the fourth tap supporting portion, the third connecting means fixes the left electrode tap of the first type lithium rechargeable battery received in the leftmost main frame of the main frames between the third lower fixing plate and the third upper fixing plate, and the fourth connecting means fixes the left electrode tap of the second type lithium rechargeable battery received in the rightmost main frame of the main frames between the fourth lower fixing plate and the fourth upper fixing plate. A fixing plate connector is bonded to each of the first upper fixing plate, the second upper fixing plate, the third upper fixing plate and the fourth upper fixing plate, and a connector of a voltage measuring line connected to a voltage measuring device is inserted into each of the fixing plate connectors. A dummy electrode tap formed of the same material as the right electrode tap of the second type lithium rechargeable battery is fixed between the third lower fixing plate and the third upper fixing plate, and a dummy electrode tap formed of the same material as the left electrode tap of the first type lithium rechargeable battery is fixed between the fourth lower fixing plate and the fourth upper fixing plate.

Preferably, the unit set further comprises a protection cover which is disposed at an upper side of each first and second connecting means, wherein a first protection cover fixing portion on which the protection cover is installed is formed at an upper end of each main frame on a horizontal extension line of the first tap supporting portion, and a second protection cover fixing portion on which the protection cover is installed is formed at an upper end of each main frame on a horizontal extension line of the second tap supporting portion.

Preferably, the each of the main frames comprises a straight bottom plate, a front vertical plate disposed upward at a front end of the bottom plate and having an air ventilating hole formed at a center portion thereof, a rear vertical plate disposed upward at a rear end of the bottom plate and having an air ventilating hole formed at a center portion thereof, a front spacing protrusion protruded forward at an upper side of the front vertical plate, and a rear spacing protrusion protruded backward at an upper side of the rear vertical plate, and each of the front spacing protrusion and the rear spacing protrusion is formed with an installing groove recessed from an upper end thereof so as to receive a straight tube in a transverse direction. And each of the front vertical plate and the rear vertical plate is formed with a left groove and a right groove that are respectively formed to be recessed from left and right ends thereof to a center portion thereof, and the center frame has a front temperature sensor inserting groove recessed from a front outer surface thereof to an inside thereof, passing through left and right surfaces thereof and communicated with a through-hole defined by the right groove of the front vertical plate of the left main frame and the left groove of the front vertical plate of the right main frame of the two adjacent main frames, and a rear temperature sensor inserting groove recessed from a rear outer surface thereof to an inside thereof, passing through left and right surfaces thereof and communicated with a through-hole defined by the right groove of the rear vertical plate of the left main frame and the left groove of the rear vertical plate of the right main frame of the two adjacent main frames.

Preferably, the front spacing protrusion has a small width portion formed at a rear side thereof, and a large width portion linked with the small width portion and formed at a front side thereof to be more protruded in a transverse direction than the small width portion, the rear spacing protrusion has a small width portion formed at a front side thereof and a large width portion linked with the small width portion and formed at a rear side thereof to be more protruded in a transverse direction than the small width portion, a part of the installing groove of the front spacing protrusion is formed at the small width portion of the front spacing protrusion, and the rest part thereof is formed at the large width portion of the front spacing protrusion, a part of the installing groove of the rear spacing protrusion is formed at the small width portion of the rear spacing protrusion, and the rest part thereof is formed at the large width portion of the rear spacing protrusion, a temperature measuring line connected to the temperature measuring device, which is guided through a gap formed between the small width portion of the front spacing protrusion of the left main frame and the small width portion of the front spacing protrusion of the right main frame of the two adjacent main frames, is connected to a temperature sensor inserted into the front temperature sensor inserting groove, and a temperature measuring line connected to the temperature measuring device, which is guided through a gap formed between the small width portion of the rear spacing protrusion of the left main frame and the small width portion of the rear spacing protrusion of the right main frame of the two adjacent main frames, is connected to a temperature sensor inserted into the rear temperature sensor inserting groove. And a voltage measuring line guided through a gap formed between the small width portion of the front spacing protrusion of the left main frame and the small width portion of the front spacing protrusion of the right main frame of the two adjacent main frames, is electrically connected to the second connecting means, and a voltage measuring line guided through a gap formed between the small width portion of the rear spacing protrusion of the left main frame and the small width portion of the rear spacing protrusion of the right main frame of the two adjacent main frames, is electrically connected to the first connecting means.

Preferably, the unit set further comprises a lithium rechargeable battery housing enclosing the unit set having a plurality of lithium rechargeable batteries and formed with an air inlet hole and an air outlet hole, wherein the air inlet hole is formed on one of an extension line of a front air path formed between an inner surface of the housing and the front vertical plate and an extension line of a rear air path formed between the inner surface of the housing and the rear vertical plate, and the air outlet hole is formed on the other of an extension line of a front air path formed between an inner surface of the housing and the front vertical plate and an extension line of a rear air path formed between the inner surface of the housing and the rear vertical plate.

Preferably, a set having a plurality of unit sets which respectively have a plurality of lithium rechargeable batteries, comprises a plurality of unit sets which are adjacent to each other; a lithium rechargeable battery housing enclosing the plurality of unit sets having a plurality of lithium rechargeable batteries and formed with an air inlet hole and an air outlet hole; wherein a rear end of a rear spacing protrusion of a front unit set of the two adjacent unit sets is connected to a front end of a front spacing protrusion of a rear unit set of the two adjacent unit sets, and the air inlet hole and the air outlet hole are formed on at least one of an extension line of a front air path formed between an inner surface of the housing and a front vertical plate of a front-most unit set of the unit sets, an extension line of a rear air path formed between the inner surface of the housing and a rear vertical plate of a rear-most unit set of the unit sets, and an extension line of a central air path formed between the rear vertical plate and the front vertical plate of the two adjacent unit sets.

ADVANTAGEOUS EFFECTS

As described above, the present invention can more securely and stably connect the plurality of lithium rechargeable batteries without a separate connecting device.

And according to the present invention, since the connection structure of the plurality of lithium rechargeable batteries is unrestricted, it is possible to freely change the voltage and the capacity of the connected lithium rechargeable batteries. Thus, its application range can be widened.

Further, since the present invention has the excellent heat radiation performance, it is possible to minimize the heat generated upon the charge/discharge, thereby previously preventing damage of the batteries.

Further, according to the present invention, it is possible to measure a voltage and a temperature of the first type lithium rechargeable battery and the second type lithium rechargeable battery received in each main frame.

DESCRIPTION OF DRAWINGS

The above and other objects, features and advantages of the present invention will become apparent from the following description of preferred embodiments given in conjunction with the accompanying drawings, in which:

FIG. 1 is a front view of a conventional lithium rechargeable battery.

FIG. 2 is a cross-sectional view taken along a line A-A of FIG. 1.

FIG. 3 is an exploded perspective view of a left end frame, a main frame, a center frame and a right end frame according to a first embodiment of the present invention.

FIG. 4 is a perspective view of the main frame according to the first embodiment of the present invention.

FIGS. 5 and 6 are schematic views of a left space portion and a right space portion formed at the main frame according to the first embodiment of the present invention.

FIG. 7 is a view showing a status that adjacent two main frames are coupled to each other, while the center frame is not shown, according to the first embodiment of the present invention.

FIG. 8 is an exploded perspective view showing the adjacent main frames, the center frame interposed between the main frames, a second type lithium rechargeable battery received in the left main frame of the adjacent main frames and a first type lithium rechargeable battery received in the right main frame according to the first embodiment of the present invention.

FIG. 9 is an exploded perspective view of the main frame and the first type lithium rechargeable battery and the second type lithium rechargeable battery received in the main frame according to the first embodiment of the present invention.

FIG. 10 is an exploded perspective view of the center frame and the first type lithium rechargeable battery and the second type lithium rechargeable battery received in the center frame according to the first embodiment of the present invention.

FIG. 11 is an exploded perspective view of the right end frame and the second type lithium rechargeable battery fixed to the right end frame according to the first embodiment of the present invention.

FIG. 12 is an exploded perspective view of the left end frame and the first type lithium rechargeable battery fixed to the left end frame according to the first embodiment of the present invention.

FIG. 13 is a rear perspective view of a protection cover according to the first embodiment of the present invention.

FIG. 14 is an exploded perspective view of the lithium rechargeable battery received in a main frame according to a second embodiment of the present invention.

FIG. 15 is a front view showing a stacked status of a right electrode tap $310\text{-}rt$ of the first type lithium rechargeable battery $310+i$ and a left electrode tap $320\text{-}lt$ of the second type lithium rechargeable battery $320+I$ which are received in the main frame $130+I$ according to the second embodiment of the present invention.

FIG. 16 is a front view showing a coupled status of a right electrode tap $310\text{-}rt$ of the first type lithium rechargeable battery $310+i$ and a left electrode tap $320\text{-}lt$ of the second type lithium rechargeable battery $320+i$ which are received in the main frame $130+i$ according to the second embodiment of the present invention.

FIG. 17 is a perspective view showing a status that an upper housing is separated according to a third embodiment of the present invention.

FIG. 18 is a perspective view of an upper housing 620 of a lithium rechargeable battery housing according to a fourth embodiment of the present invention.

FIG. 19 is a perspective view of an upper housing 620 of a lithium rechargeable battery housing according to a fifth embodiment of the present invention.

FIG. 20 is a perspective view showing a status that an upper housing is separated according to a sixth embodiment of the present invention.

FIG. 21 is a schematic view of a ventilation path according to the sixth embodiment of the present invention.

FIG. 22a is a perspective view of an upper housing according to a seventh embodiment of the present invention.

FIG. 22b is a schematic view of a ventilation path according to the seventh embodiment of the present invention.

FIG. 23a is a perspective view of an upper housing according to an eighth embodiment of the present invention.

FIG. 23b is a schematic view of a ventilation path according to the eighth embodiment of the present invention.

FIG. 24a is a perspective view of an upper housing according to a ninth embodiment of the present invention.

FIG. 24b is a schematic view of a ventilation path according to the ninth embodiment of the present invention.

DETAILED DESCRIPTION OF MAIN ELEMENTS

110: left end frame
110-6: front spacing protrusion
110-7: rear spacing protrusion
110-10: bus bar guiding portion
110-12: lower front coupling protrusion
110-13: lower rear coupling protrusion
120: right end frame
120-2$g$: front temperature sensor inserting groove
120-3$g$: rear temperature sensor inserting groove
120-12: lower front coupling protrusion
120-12$p$: hollow coupling protrusion
120-13: lower rear coupling protrusion
120-13$p$: hollow coupling protrusion
120-6: front coupling protrusion
120-6$p$: hollow coupling protrusion
120-6$g$: installing groove
120-6$s$: small width portion
120-6$l$: large width portion
120-6$sl$: left protruded portion
120-7: rear coupling protrusion
120-7$p$: hollow coupling protrusion
120-7$g$: installing groove
120-7$s$: small width portion
120-7$l$: large width portion
120-7$sl$: left protruded portion
120-8: fourth tap supporting portion
120-8$p$: guide protrusion
120-9: fourth virtual tap supporting portion
120-9$p$: virtual guide protrusion
120-10: bus bar guiding portion
130+1, . . . , 130+$r$, 130+($r$+1), . . . , 130+n: main frame
130+$r$: left main frame
130+($r$+1): right main frame
130-1: bottom plate
130-2: front vertical plate
130-2$h$: air ventilating hole
130-2$lg$: left groove
130-2$rg$: right groove
130-3: rear vertical plate
130-3$h$: air ventilating hole
130-3$rg$: right groove
130-3$lg$: left groove
130-5: rear vertical supporter
130-5$h$: air ventilating hole
130-6: front spacing protrusion
130-6$g$: installing groove
130-6$s$: small width portion
130-6$l$: large width portion
130-6$h$: coupling hole 130-7: rear spacing protrusion
130-7g: installing groove
130-7s: small width portion
130-7l: large width portion
130-7h: coupling hole
130-8: first tap supporting portion
130-8p: guide protrusion
130-9: first protection cover fixing portion
130-9h: coupling hole
130-10: bus bar guiding portion
130-12: lower front coupling protrusion
130-12h: coupling hole
130-13: lower rear coupling protrusion
130-13h: coupling hole LS: left space portion
RS: right space portion 230+r: center frame
230-2g: front temperature sensor inserting groove
230-3g: rear temperature sensor inserting groove
230-6: upper front coupling protrusion
230-6p: hollow coupling protrusion
230-7: upper rear coupling protrusion
230-7p: hollow coupling protrusion
230-8: second supporting portion
230-8p: installing groove
230-9: second protection cover fixing portion
230-9h: coupling hole
230-10: bus bar guiding portion
230-12: upper front coupling protrusion
230-12p: hollow coupling protrusion
230-13: upper rear coupling protrusion
230-13p: hollow coupling protrusion fh: front throughhole
130-6$t_1$: first gap
310+i: first type lithium rechargeable battery
310+(r+1): first type lithium rechargeable battery
310-LT: left electrode tap
310-lth: coupling groove
310-RT: right electrode tap
310-rth: coupling groove
320+i: second type lithium rechargeable battery
320+r: second type lithium rechargeable battery
320-LT: left electrode tap
320-lth: coupling groove
320-RT: right electrode tap
320-rth: coupling groove
410+i: first connecting means
410-l: first lower fixing plate
410-2: first upper fixing plate
410-2c: fixing plate connector
410-3: first coupling unit
420+r: second connecting means
420-1: second lower fixing plate
420-2: second upper fixing plate
420-2c: fixing plate connector
420-3: second coupling unit
430: third connecting means
430-1: third lower fixing plate
430-2: third upper fixing plate
430-2c: fixing plate connector
430-3: third coupling unit
430-dt: dummy electrode tap
440: fourth connecting means
440-1: fourth lower fixing plate
440-2: fourth upper fixing plate
440-2c: fixing plate connector
440-3: fourth coupling unit
440-dt: dummy electrode tap
500: protection cover
510: first protection cover
512: first coupling plate
512-1: supporting portion
512-3: coupling protrusion
520: second protection cover
522: second coupling plate
522-1: supporting portion
522-3: coupling protrusion
610: lower housing 620: upper housing
622: air inlet hole 624: air outlet hole
1000+f: front unit set 1000+r: rear unit set
1002: center air path 1004-f: front air path
1004-r: rear air path 1610: lower housing
1620: upper housing 1622: air inlet hole
1624: air outlet hole
1624-f, 1624-r: air outlet hole

BEST MODE

Hereinafter, the embodiments of the present invention will be described in detail with reference to accompanying drawings.

First Embodiment

The embodiment relates to a unit set having a plurality of lithium rechargeable batteries according to the present invention.

FIG. 3 is an exploded perspective view of a left end frame, a main frame, a center frame and a right end frame according to a first embodiment of the present invention.

Referring to FIG. 3, the first embodiment includes a left end frame 110, a right end frame 120 and a plurality of main frames 130+1, ..., 130+r, 130+(r+1), ..., 130+n. The plurality of main frames 130+1, ..., 130+r, 130+(r+1), ..., 130+n are arranged between the left end frame 110 and the right end frame 120 to be adjacent to each other, and a center frame 230+r is provided between the optional adjacent two main frames 130+r and 130+(r+1), wherein r is a natural number from 1 to n−1 and this will be the same.

FIG. 4 is a perspective view of the main frame according to the first embodiment of the present invention.

Referring to FIG. 4, an optional main frame 130+i is provided with a straight bottom plate 130-1, wherein I is a natural number from 1 to n and this will be the same.

Referring to FIG. 4, a front vertical plate 130-2 is disposed upward at a front end of the bottom plate 130-1, and the front vertical plate 130-2 has an air ventilating hole 130-2h formed at a center portion thereof, and a left groove 130-2lg and a right groove 130-2rg that are respectively formed to be recessed from left and right ends thereof to the center portion thereof. The left groove 130-2lg and the right groove 130-2rg are also formed at both side portions of the center portion to be opposed to each other.

Referring to FIG. 4, a rear vertical plate 130-3 is disposed upward at a rear end of the bottom plate 130-1, and the rear vertical plate 130-3 has an air ventilating hole (not shown) formed at a center portion thereof, and a left groove 130-3lg and a right groove (not shown) that are respectively formed to be recessed from left and right ends to the center portion thereof. A rear vertical supporter 130-5 is provided at an internal surface of the rear vertical plate 130-3, and the rear vertical supporter 130-5 has an air ventilating hole 130-5h communicated with the air ventilating hole (not shown) formed at the center portion of the rear vertical plate 130-3. Although not shown in FIG. 4, a front vertical supporter (not shown) is provided at an internal surface of the front vertical plate 130-2 as in the rear vertical plate 130-3, and the front vertical supporter (not shown) has an air ventilating hole (not shown) communicated with the air ventilating hole 130-2*h* formed at the center portion of the front vertical plate 130-2.

Referring to FIG. 4, a front spacing protrusion 130-6 is protruded forward at an upper side of the front vertical plate 130-2, and the front spacing protrusion 130-6 has an installing groove 130-6*g* recessed from an upper end thereof so as to receive a straight tube (not shown) in a transverse direction. The front spacing protrusion 130-6 has a small width portion 130-6*s* formed at a rear side thereof and a large width portion 130-6*l* linked with the small width portion 130-6*s*. The large width portion 130-6*l* is protruded in a transverse direction to be wider in width than the small width portion 130-6*s*. A part of the installing groove 130-6*g* of the front spacing protrusion 130-6 is formed at the small width portion 130-6*s* of the front spacing protrusion 130-6, and the rest part thereof is formed at the large width portion 130-6*l* of the front spacing protrusion 130-6. The small width portion 130-6*s* of the front spacing protrusion 130-6 is formed with a coupling hole 130-6*h* penetrated in the transverse direction.

Referring to FIG. 4, a rear spacing protrusion 130-7 is protruded backward at an upper side of the rear vertical plate 130-3, and the rear spacing protrusion 130-7 has an installing groove 130-7*g* recessed from an upper end thereof so as to receive a straight tube (not shown) in the transverse direction. The rear spacing protrusion 130-7 has a small width portion 130-7*s* formed at a front side thereof and a large width portion 130-7*l* linked with the small width portion 130-7*s*. The large width portion 130-7*l* is protruded in a transverse direction to be wider in width than the small width portion 130-7*s*. A part of the installing groove 130-7*g* of the rear spacing protrusion 130-7 is formed at the small width portion 130-7*s* the rear spacing protrusion 130-7, and the rest portion thereof is formed at the large width portion 130-7*l* of the rear spacing protrusion 130-7. The small width portion 130-7*s* of the rear spacing protrusion 130-7 is formed with a coupling hole 130-7*h* penetrated in the transverse direction.

Referring to FIG. 4, a first tap supporting portion 130-8 is formed at an upper end of the main frame 130+*i* to be exposed to an outside. The first tap supporting portion 130-8 is formed into a straight plate and has a guide protrusion 130-8*p* formed at each front end and rear end thereof.

Referring to FIG. 4, a first protection cover fixing portion 130-9 is formed at the upper end of the main frame 130+*i*, and the first protection cover fixing portion 130-9 is protruded upward from the first tap supporting portion 130-8. A coupling hole 130-9*h* is formed at the first protection cover fixing portion 130-9. Meanwhile, a U-shaped bus bar guiding portion 130-10 can be formed between the first tap supporting portion 130-8 and the first protection cover fixing portion 130-9 so as to guide a bus bar. With the bus bar guiding portion 130-10 in the center, the first tap supporting portion 130-8 is formed at the side of the rear spacing protrusion 130-7 and the first protection cover fixing portion 130-9 is formed at the side of the front spacing protrusion 130-6.

Referring to FIG. 4, a lower front coupling protrusion 130-12 is formed at the front vertical plate 130-2 to be protruded forward, and the lower front coupling protrusion 130-12 is formed with a coupling hole 130-12*h* penetrated in the transverse direction.

Referring to FIG. 4, a lower rear coupling protrusion 130-13 is formed at the rear vertical plate 130-3 to be protruded backward, and the lower rear coupling protrusion 130-13 is formed with a coupling hole 130-13*h* penetrated in the transverse direction.

FIGS. 5 and 6 are schematic views of a left space portion and a right space portion formed at the main frame according to the first embodiment of the present invention.

Referring to FIG. 5, a left space portion LS is formed at a lower left side of the first tap supporting portion 130-8 and the first protection cover fixing portion 130-9 of the main frame 130+*i*, and referring to FIG. 6, a right space portion RS is formed at a lower right side of the first tap supporting portion 130-8 and the first protection cover fixing portion 130-9 of the main frame 130+*i*.

FIG. 7 is a view showing a status that adjacent two main frames 130+*r* and 130+(*r*+1) are coupled to each other, while the center frame 230+*r* (FIG. 3) is not shown, according to the first embodiment of the present invention.

Referring to FIG. 7, a right surface of the large width portion large 130-6*l* of the left main frame 130+*r* is contacted with a left surface of the large width portion large 130-6*l* of the right main frame 130+(*r*+1), and thus a space is formed between a right surface of the small width portion large 130-6*s* of the left main frame 130+*r* and a left surface of the small width portion large 130-6*s* of the right main frame 130+(*r*+1).

And in the same way, a right surface of the large width portion large 130-7*l* of the left main frame 130+*r* is contacted with a left surface of the large width portion large 130-7*l* of the right main frame 130+(*r*+1), and thus a space is formed between a right surface of the small width portion large 130-7*s* of the left main frame 130+*r* and a left surface of the small width portion large 130-7*s* of the right main frame 130+(*r*+1).

FIG. 8 is an exploded perspective view showing the adjacent main frames, the center frame interposed between the main frames, a second type lithium rechargeable battery received in the left main frame of the adjacent main frames and a first type lithium rechargeable battery received in the right main frame according to the first embodiment of the present invention.

Referring to FIG. 8, an upper front coupling protrusion 230-6 and an upper rear coupling protrusion 230-7 are formed at both upper edges of the center frame 230+r. Each of the upper front coupling protrusion 230-6 and the upper rear coupling protrusion 230-7 is formed with a hollow coupling protrusion 230-6*p*, 230-7*p* formed into a hollow shaft that is formed to penetrate each of the upper front coupling protrusion 230-6 and the upper rear coupling protrusion 230-7 in the transverse direction. A left end of the hollow coupling protrusion 230-6*p* is formed to be coupled to a right side of the coupling hole 130-6*h* of the left main frame 130+*r*, and a right end of the hollow coupling protrusion 230-6*p* is formed to be coupled to a left side of the coupling hole 130-6*h* of the right main frame 130+(*r*+1). In the same way, a left end of the hollow coupling protrusion 230-7*p* is formed to be coupled to a right side of the coupling hole 130-7*h* of the left main frame 130+*r*, and a right end of the hollow coupling protrusion 230-7*p* is formed to be coupled to a left side of the coupling hole 130-7*h* of the right main frame 130+(*r*+1).

Referring to FIG. 8, a second tap supporting portion 230-8 is formed at an upper end of the center frame 230+*r* to be exposed to an outside. The second tap supporting portion 230-8 is formed into a straight plate and has a guide protrusion 230-8*p* formed at each front and rear end thereof.

Referring to FIG. 8, a second protection cover fixing portion 230-9 is formed at the upper end of the center frame 230+r, and the second protection cover fixing portion 230-9 is protruded upward from the second tap supporting portion 230-8. A coupling hole 230-9*h* is formed at the second protection cover fixing portion 230-9. Meanwhile, a U-shaped bus bar guiding portion 230-10 can be formed between the second tap supporting portion 230-8 and the second protection cover fixing portion 230-9 so as to guide a bus bar. With the bus bar guiding portion 230-10 in the center, the second tap supporting portion 230-8 is formed at the side of the upper front spacing protrusion 230-6 and the second protection cover fixing portion 230-9 is formed at the side of the upper rear spacing protrusion 230-7.

Referring to FIG. 8, a lower front coupling protrusion 230-12 is formed at a lower front end of the center frame 230+$r$ to be protruded forward, and a lower rear coupling protrusion 230-13 is formed at a lower rear end of the center frame 230+$r$ to be protruded backward. The lower front coupling protrusion 230-12 and the lower rear coupling protrusion 230-13 are respectively formed with a hollow coupling protrusion 230-12$p$, 230-13$p$ formed into a hollow shaft that is formed to penetrate each of the lower front coupling protrusion 230-12 and the lower rear coupling protrusion 230-13 in the transverse direction. A left end of the hollow coupling protrusion 230-12$p$ is formed to be coupled to a right side of the coupling hole 130-12$h$ of the left main frame 130+$r$, and a right end of the hollow coupling protrusion 230-12$p$ is formed to be coupled to a left side of the coupling hole 130-12$h$ of the right main frame 130+($r$+1). In the same way, a left end of the hollow coupling protrusion 230-13$p$ is formed to be coupled to a right side of the coupling hole 130-13$h$ of the left main frame 130+$r$, and a right end of the hollow coupling protrusion 230-13$p$ is formed to be coupled to a left side of the coupling hole 130-13$h$ of the right main frame 130+($r$+1).

Referring to FIG. 8, the center frame 230+$r$ is formed with a front temperature sensor inserting groove 230-2$g$ and a rear temperature sensor inserting groove 230-3$g$. The front temperature sensor inserting groove 230-2$g$ is formed to be recessed from a front outer surface of the center frame 230+$r$ to an inside thereof and also to penetrate left and right surfaces thereof, and the rear temperature sensor inserting groove 230-3$g$ is formed to be recessed from a rear outer surface of the center frame 230+$r$ to the inside thereof and also to penetrate the left and right surfaces thereof. Referring to FIGS. 7 and 8, the front temperature sensor inserting groove 230-2$g$ is communicated with a front through-hole fh defined by the right groove 130-2$rg$ of the front vertical plate of the left main frame 130+$r$ and the left groove 130-21$g$ of the front vertical plate of the right main frame 130+($r$+1). A front temperature sensor (not shown) is inserted through the front through-hole fh. Referring to FIGS. 7 and 8, In the same way, the rear temperature sensor inserting groove 230-3$g$ is communicated with a rear through-hole rh defined by the right groove 130-3$rg$ of the rear vertical plate of the left main frame 130+$r$ and the left groove 130-31$g$ of the rear vertical plate of the right main frame 130+($r$+1). A rear temperature sensor (not shown) is inserted through the rear through-hole rh.

Referring to FIG. 7, a temperature measuring line (not shown) connected to the front temperature sensor (not shown) inserted through the front through-hole fh is guided through a first gap 130-6$t_1$ and then introduced into the straight guiding tube (not shown) received in the installing groove 130-6$g$ of the main frame 130+1, . . . , 130+$r$, 130+($r$+1), . . . , 130+$n$. The first gap 130-6$t_1$ is just the gap formed between the installing groove 130-6$g$ of the left main frame 130+$r$ and the installing groove 130-6$g$ of the right main frame 130+($r$+1) out of the gap formed between the small width portion 130-6$s$ of the left main frame 130+$r$ and the small width portion 130-6$s$ of the right main frame 130+($r$+1). In the same way, a temperature measuring line (not shown) connected to the rear temperature sensor (not shown) inserted through the rear through-hole rh is guided through a first gap (not shown) and then introduced into the straight guiding tube (not shown) received in the installing groove 130-7$g$ of the main frame 130+1, . . . , 130+$r$, 130+($r$+1), . . . , 130+$n$. The first gap (not shown) is just the gap formed between the installing groove 130-7$g$ of the left main frame 130+$r$ and the installing groove 130-7$g$ of the right main frame 130+($r$+1) out of the gap formed between the small width portion 130-7$s$ of the left main frame 130+$r$ and the small width portion 130-7$s$ of the right main frame 130+($r$+1).

FIG. 9 is an exploded perspective view of the main frame and the first type lithium rechargeable battery and the second type lithium rechargeable battery received in the main frame according to the first embodiment of the present invention.

Referring to FIGS. 5 and 9, a first type lithium rechargeable battery 310+$i$ is received in the left space portion LS of the main frame 130+$i$, wherein i is a natural number from 1 to n and this will be the same. The first type lithium rechargeable battery 310+$i$ has a left electrode tap 310-$lt$ and a right electrode tap 310-$rt$, and the left electrode tap 310-$lt$ is bent to a left side of a pouch (not designated by a reference numeral) to be protruded to a left side of an outer surface of the pouch, and the right electrode tap 310-$rt$ is bent to a right side of the pouch (not designated by a reference numeral) to be protruded to a right side of the outer surface of the pouch. The left electrode tap 310-1$t$ is an anode tap or a cathode tap, and the right electrode tap 310-$rt$ is the opposite electrode tap. The left electrode tap 310-1$t$ and the right electrode tap 310-$rt$ are respectively formed with a coupling groove 310-$lth$, 310-$rth$. Meanwhile, the left electrode tap 310-$lt$ and the right electrode tap 310-$rt$ in the embodiment may be respectively formed with a coupling hole (not shown) instead of the coupling groove 310-$lth$, 310-$rth$.

Referring to FIGS. 6 and 9, a second type lithium rechargeable battery 320+$i$ is received in the right space portion RS of the main frame 130+$i$, wherein i is a natural number from 1 to n and this will be the same. The second type lithium rechargeable battery 320+$i$ has a left electrode tap 320-$lt$ and a right electrode tap 320-$rt$, and the left electrode tap 320-$lt$ is bent to a left side of a pouch (not designated by a reference numeral) to be protruded to a left side of an outer surface of the pouch, and the right electrode tap 320-$rt$ is bent to a right side of the pouch (not designated by a reference numeral) to be protruded to a right side of the outer surface of the pouch. The left electrode tap 320-$lt$ of the second type lithium rechargeable battery 320+$i$ is protruded to be opposed to the right electrode tap 310-$rt$ of the first type lithium rechargeable battery 310+$i$, and has an opposite polarity to that of the right electrode tap 310-$rt$ of the first type lithium rechargeable battery 320+$i$. The right electrode tap 320-$rt$ of the second type lithium rechargeable battery 320+$i$ is protruded to be opposed to the left electrode tap 310-$lt$ of the first type lithium rechargeable battery 310+$i$, and has an opposite polarity of the left electrode tap 310-$lt$ of the first type lithium rechargeable battery 310+$i$. The left electrode tap 320-$lt$ and the right electrode tap 320-$rt$ are respectively formed with a coupling groove 320-$lth$, 320-$rth$. Meanwhile, the left electrode tap 320-$lt$ and the right electrode tap 320-$rt$ in the embodiment may be respectively formed with a coupling hole (not shown) instead of the coupling groove 320-$lth$, 320-$rth$.

Referring to FIG. 9, the right electrode tap 310-$rt$ of the first type lithium rechargeable battery 310+$i$ received in the main frame 130+$i$ and the left electrode tap 320-$lt$ of the second type lithium rechargeable battery 320+$i$ received in the main frame 130+$i$ are electrically connected in series by a first connecting means 410+$i$.

Referring to FIG. 9, the first connecting means 410+$i$ is provided with a first lower fixing plate 410-1, a first upper fixing plate 410-2 and a first coupling unit 410-3. The first lower fixing plate 410-1, the first upper fixing plate 410-2 and the first coupling unit 410-3 may be formed of a conductive material. The first lower fixing plate 410-1 is mounted on the first tap supporting portion 130-8 of the main frame 130+*i*, and formed with a coupling groove 410-1*h* fitted into the guide protrusion 130-8*p*. A bolt (not designated by a reference numeral) is formed to be protruded upward from the first lower fixing plate 410-1. The first upper fixing plate 410-2 is formed with a through-hole (not designated by a reference numeral) through which the bolt (not designated by a reference numeral) of the first lower fixing plate 410-1 passes. A fixing plate connector 410-2*c* is bonded to the first upper fixing plate 410-2.

Referring to FIG. 9, the first coupling unit 410-3 is installed to an end of the bolt (not designated by a reference numeral) of the first lower fixing plate 410-1. The right electrode tap 310-*rt* of the first type lithium rechargeable battery 310+*i* and the left electrode tap 320-*lt* of the second type lithium rechargeable battery 320+*i* are disposed between the first lower fixing plate 410-1 and the first upper fixing plate 410-2 and then electrically connected to each other by the first coupling unit 410-3. At this time, the right electrode tap 310-*rt* of the first type lithium rechargeable battery 310+*i* and the left electrode tap 320-*lt* of the second type lithium rechargeable battery 320+*i* are stacked up and down, and the coupling groove 310-*rth* of the first type lithium rechargeable battery 310+*i* and the coupling groove 320-*lth* of the second type lithium rechargeable battery 320+*i* enclose the bolt (not designated by a reference numeral) of the first lower fixing plate 410-1. Therefore, a contact surface area between the right electrode tap 310-*rt* of the first type lithium rechargeable battery 310+*i* and the left electrode tap 320-*lt* of the second type lithium rechargeable battery 320+*i* is increased, thereby improving an electrical connecting state and a coupling force therebetween.

Referring to FIG. 9, the fixing plate connector 410-2*c* is bonded to the first upper fixing plate 410-2 and electrically connected with the right electrode tap 310-*rt* of the first type lithium rechargeable battery 310+*i* received in the main frame 130+*i* and the left electrode tap 320-*lt* of the second type lithium rechargeable battery 320+*i* received in the main frame 130+*i*. A connector (not shown) of an i-th rear voltage measuring line (not shown) connected to a voltage measuring device (not shown) is inserted into the fixing plate connector 410-2*c*. In case of i=r, as shown in FIG. 7, an r-th rear voltage measuring line (not shown) is guided to the fixing plate connector 410-2*c* (referring to FIG. 9) of the first connecting means 410+*i* (referring to FIG. 9) through a second gap 130-7$t_2$ formed between the small width portion 130-7*s* of the left main frame 130+*r* and the small width portion 130-7*s* of the right main frame 130+(*r*+1).

FIG. 10 is an exploded perspective view of the center frame and the first type lithium rechargeable battery and the second type lithium rechargeable battery received in the center frame according to the first embodiment of the present invention.

Referring to FIG. 10, the right electrode 320-*rt* of the second type lithium rechargeable battery 320+*r* received in the left main frame 130+*r* and the left electrode 310-*lt* of the first type lithium rechargeable battery 310+(*r*+1) received in the right main frame 130+(*r*+1) are electrically connected in series by a second connecting means 420+*r*.

Referring to FIG. 10, the second connecting means 420+*r* is provided with a second lower fixing plate 420-1, a second upper fixing plate 420-2 and a second coupling unit 420-3. The second lower fixing plate 420-1, the second upper fixing plate 420-2 and the second coupling unit 420-3 may be formed of a conductive material. The second lower fixing plate 420-1 is mounted on the second tap supporting portion 230-8 of the main frame 230+*r*, and formed with a coupling groove 420-1*h* fitted into the guide protrusion 230-8*p*. A bolt (not designated by a reference numeral) is formed to be protruded upward from the second lower fixing plate 420-1. The second upper fixing plate 420-2 is formed with a through-hole (not designated by a reference numeral) through which the bolt (not designated by a reference numeral) of the second lower fixing plate 420-1 passes. A fixing plate connector 420-2*c* is bonded to the second upper fixing plate 420-2.

Referring to FIG. 10, the second coupling unit 420-3 is installed to an end of the bolt (not designated by a reference numeral) of the second lower fixing plate 420-1. The right electrode tap 320-*rt* of the second type lithium rechargeable battery 320+*r* and the left electrode tap 310-*lt* of the first type lithium rechargeable battery 310+(*r*+1) are disposed between the second lower fixing plate 420-1 and the second upper fixing plate 420-2 and then electrically connected to each other by the second coupling unit 420-3. At this time, the right electrode tap 320-*rt* of the second type lithium rechargeable battery 320+*r* and the left electrode tap 310-*lt* of the first type lithium rechargeable battery 310+(*r*+1) are stacked, and the coupling groove 320-*rth* of the second type lithium rechargeable battery 320+*r* and the coupling groove 310-*lth* of the first type lithium rechargeable battery 310+(*r*+1) enclose the bolt (not designated by a reference numeral) of the second lower fixing plate 420-1. Therefore, a contact surface area between the right electrode tap 320-*rt* of the second type lithium rechargeable battery 320+*r* and the left electrode tap 310-*lt* of the first type lithium rechargeable battery 320+(*r*+1) is increased, thereby improving an electrical connecting state and a coupling force therebetween.

Referring to FIG. 10, the fixing plate connector 420-2*c* is bonded to the second upper fixing plate 420-2 and electrically connected with the right electrode tap 320-*rt* of the second type lithium rechargeable battery 320+*r* received in the left main frame 130+*r* and the left electrode tap 310-*lt* of the first type lithium rechargeable battery 310+(*r*+1) received in the right main frame 130+(*r*+1). A connector (not shown) of an r-th front voltage measuring line (not shown) connected to a voltage measuring device (not shown) is inserted into the fixing plate connector 420-2*c*. Referring to FIGS. 7 and 10, an r-th front voltage measuring line (not shown) is guided to the fixing plate connector 420-2*c* of the second connecting means 420+*r* through a second gap (130-6$t_2$) formed between the small width portion 130-6*s* of the left main frame 130+*r* and the small width portion 130-6*s* of the right main frame 130+(*r*+1).

FIG. 11 is an exploded perspective view of the right end frame and the second type lithium rechargeable battery fixed to the right end frame according to the first embodiment of the present invention.

Referring to FIG. 11, a fourth tap supporting portion 120-8 is formed at an upper end of the right end frame 120 to be exposed to an outside. The fourth tap supporting portion 120-8 is formed into a straight plate and has a guide protrusion 120-8*p* formed at each front end and rear end thereof.

Referring to FIG. 11, a fourth virtual tap supporting portion 120-9 is formed at the upper end of the right end frame 120 in the same type as the fourth tap supporting portion 120-8. Therefore, a virtual guide protrusion 120-9*p* is formed at each front and rear end of the fourth virtual tap supporting portion 120-9, and the fourth virtual tap supporting portion 120-9 is formed on a horizontal extension line of the fourth tap supporting portion 120-8.

Referring to FIG. 11, a U-shaped bus bar guiding portion 120-10 can be formed between the fourth tap supporting portion 120-8 and the fourth virtual tap supporting portion 120-9 so as to guide a bus bar. With the bus bar guiding portion 120-10 in the center, the fourth tap supporting portion 120-8 is formed at a front side and the fourth virtual tap supporting portion 120-9 is formed at a rear side.

Referring to FIG. 11, a front spacing protrusion 120-6 is protruded forward at a front side of the fourth tap supporting portion 120-8, and the front spacing protrusion 120-6 has an installing groove 120-6g recessed from an upper end thereof so as to receive a straight tube in the transverse direction. The front spacing protrusion 120-6 has a small width portion 120-6s formed at a rear side thereof, a large width portion 120-6l linked with the small width portion 120-6s and a left protruded portion 120-6sl formed at a left lower end of the small width portion 120-6s so as to be spaced apart from the large width portion 120-6l and protruded to a left side. The large width portion 120-6l is protruded to a left side to be wider in width than the small width portion 120-6s, and thus a left end of the large width portion 120-6l and a left end of the left protruded portion 120-6s1 are positioned on the same plane. A part of the installing groove 120-6g of the front spacing protrusion 120-6 is formed at the small width portion 120-6s of the front spacing protrusion 120-6, and the rest part thereof is formed at the large width portion 120-6l of the front spacing protrusion 120-6. The front spacing protrusion 120-6 is formed with a hollow coupling protrusion 120-6p formed into a hollow shaft that is formed to penetrate each of the small width portion 120-6s and the left protruded portion 120-6sl in the transverse direction.

Referring to FIG. 11, a rear spacing protrusion 120-7 is protruded backward at a rear side of the fourth virtual tap supporting portion 120-9, and the rear spacing protrusion 120-7 has an installing groove 120-7g recessed from an upper end thereof so as to receive a straight tube in the transverse direction. The rear spacing protrusion 120-7 has a small width portion 120-7s formed at a front side thereof, a large width portion 120-7l linked with the small width portion 120-7s and a left protruded portion 120-7sl formed at a left lower end of the small width portion 120-7s so as to be spaced apart from the large width portion 120-7l and protruded to a left side. The large width portion 120-7l is protruded to a left side to be wider in width than the small width portion 120-7s, and thus a left end of the large width portion 120-7l and a left end of the left protruded portion 120-7sl are positioned on the same plane. A part of the installing groove 120-7g of the rear spacing protrusion 120-7 is formed at the small width portion 120-7s of the rear spacing protrusion 120-7, and the rest part thereof is formed at the large width portion 120-7l of the rear spacing protrusion 120-7. The rear spacing protrusion 120-7 is formed with a hollow coupling protrusion 120-7p formed into a hollow shaft that is formed to penetrate each of the small width portion 120-7s and the left protruded portion 120-7sl in the transverse direction.

Referring to FIG. 11, a lower front coupling protrusion 120-12 is formed at a front lower side of the right end frame 120 to be protruded forward, and a lower rear coupling protrusion 120-13 is formed at a rear lower side of the right end frame 120 to be protruded backward. The lower front coupling protrusion 120-12 and the lower rear coupling protrusion 120-13 are respectively formed with a hollow coupling protrusion 120-12p, 120-13p formed into a hollow shaft that is formed to penetrate each of the lower front coupling protrusion 120-12 and the lower rear coupling protrusion 120-13 in the transverse direction. A left end of the hollow coupling protrusion 120-12p is formed to be coupled to a right side of the coupling hole 130-12h of the leftmost main frame 130+n. In the same way, a left end of the hollow coupling protrusion 230-13p is formed to be coupled to a right side of the coupling hole 130-13h of the leftmost main frame 130+n.

Referring to FIG. 11, the right end frame 120 is formed with a front temperature sensor inserting groove 120-2g and a rear temperature sensor inserting groove 120-3g. The front temperature sensor inserting groove 120-2g is formed to be recessed at a left outer surface of the right end frame 120 so that a front end thereof is opened forward. The opened front end of the front temperature sensor inserting groove 120-2g is adjacent to the right groove 130-2rg of the front vertical plate of the leftmost main frame 130+n so as to form a through-hole through which a front temperature sensor (not shown) can be inserted. A temperature measuring line (not shown) connected to the front temperature sensor (not shown) inserted through the front through-hole 120-2g is guided through a gap defined by the small width portion 130-6s of the rightmost main frame 130+n and the small width portion 120-6s of the right end frame 120 and then introduced into the straight guiding tube (not shown) received in the installing groove 130-6g of the main frame 130+1, . . . , 130+r, 130+(r+1), . . . , 130+n. The description of a rear through-hole 120-3g through which a rear temperature sensor (not shown) is inserted and a temperature measuring line (not shown) connected to the rear temperature sensor is the same as that of the front through-hole 120-2g and the temperature measuring line (not shown) connected to the front temperature sensor (not shown) inserted through the front through-hole 120-2g.

Referring to FIG. 11, the right electrode tap 320-rt of the second type lithium rechargeable battery 320+n received in the rightmost main frame 130+n is fixedly installed to the fourth tap supporting portion 120-8 by a fourth connecting means 440.

Referring to FIG. 11, the fourth connecting means 440 is provided with a fourth lower fixing plate 440-1, a fourth upper fixing plate 440-2 and a fourth coupling unit 440-3. The fourth lower fixing plate 440-1, the fourth upper fixing plate 440-2 and the fourth coupling unit 440-3 may be formed of a conductive material. The fourth lower fixing plate 440-1 is mounted on the fourth tap supporting portion 120-8 of the right end frame 120 and formed with a coupling groove 440-1h fitted into the guide protrusion 120-8p. A bolt (not designated by a reference numeral) is formed to be protruded upward from the fourth lower fixing plate 440-1. The fourth upper fixing plate 440-2 is formed with a through-hole (not designated by a reference numeral) through which the bolt (not designated by a reference numeral) of the fourth lower fixing plate 440-1 passes. A fixing plate connector 440-2c is bonded to the fourth upper fixing plate 440-2.

Referring to FIG. 11, the fourth coupling unit 440-3 is installed to an end of the bolt (not designated by a reference numeral) of the fourth lower fixing plate 440-1. The right electrode tap 320-rt of the second type lithium rechargeable battery 320+n is disposed between the fourth lower fixing plate 440-1 and the fourth upper fixing plate 440-2 and then fixed by the fourth coupling unit 440-3. At this time, the coupling groove 320-rth of the second type lithium rechargeable battery 320+n encloses the bolt (not designated by a reference numeral) of the fourth lower fixing plate 440-1.

Referring to FIG. 11, meanwhile, a dummy electrode tap 440-dt is fixed between the fourth lower fixing plate 440-1 and the fourth upper fixing plate 440-2. The dummy electrode tap 440-dt is formed of the same material as the left electrode tap 310+lt of the first type lithium rechargeable battery 310+i. Therefore, a resistance between the fourth lower fixing plate 440-1 and the fourth upper fixing plate 440-2 of the fourth connecting means 440 can be controlled to be equal to that between the first lower fixing plate 410-1 and the first upper fixing plate 410-2 of the first connecting means 410+n.

Referring to FIG. 11, the fixing plate connector 440-2c is boned to the fourth upper fixing plate 440-2 and electrically connected with the right electrode tap 320-rt of the second type lithium rechargeable battery 320+n received in the rightmost main frame 130+n and the dummy electrode tap 440-dt. A connector (not shown) of an n-th front voltage measuring line (not shown) connected to the voltage measuring device (not shown) is inserted into the fixing plate connector 440-2c. The n-th front voltage measuring line (not shown) is guided to the fixing plate connector 440-2c of the fourth connecting means 440 through a gap formed between the small width portion 130-6s of the rightmost main frame 130+n and the small width portion 120-6s of the right end frame 120.

Referring to FIG. 11, meanwhile, the n-th rear voltage measuring line (not shown) is guided to the fixing plate connector 410-2c of the first connecting means 410+n through a gap formed between the small width portion 130-7s of the rightmost main frame 130+n and the small width portion 120-7s of the right end frame 120.

FIG. 12 is an exploded perspective view of the left end frame and the first type lithium rechargeable battery fixed to the left end frame according to the first embodiment of the present invention.

The end frame 110 of FIG. 12 is a mirror image of the right end frame 120 of FIG. 11. Therefore, a third tap supporting portion (not shown) is formed at an upper end of the left end frame 110 to be exposed in a direction opposed to the fourth tap supporting portion 120-8, and a guide protrusion (not shown) is formed to be protruded at each front and rear end of the third tap supporting portion (not shown), like at the fourth tap supporting portion 120-8. A third virtual tap supporting portion (not shown) is formed at an upper end of the left end frame 110 to be exposed in a direction opposed to the fourth virtual tap supporting portion 120-9, and a guide protrusion (not shown) is formed to be protruded at each front and rear end of the third virtual tap supporting portion (not shown), like at the fourth virtual tap supporting portion 120-9. Further, a U-shaped bus bar guiding portion 110-10 can be formed at the left end frame 110. A front spacing protrusion 110-6 and a rear spacing protrusion 110-7 are formed at an upper end of the left end frame 110, and a lower front coupling protrusion 110-12 and a lower rear coupling protrusion 110-13 are formed at a lower end of the left end frame 110. Also, the left end frame 110 is formed with a front temperature sensor inserting groove (not shown) and a rear temperature sensor inserting groove (not shown), respectively. The description of the front and rear through-holes and other parts of the left end frame 110 is the same as that in the right end frame 120.

Referring to FIG. 12, the left electrode tap 310-lt of the first type lithium rechargeable battery 310+1 received in the leftmost main frame 130+1 is fixedly installed to the third tap supporting portion (not shown) by a third connecting means 430.

Referring to FIG. 12, the third connecting means 430 is provided with a third lower fixing plate 430-1, a third upper fixing plate 430-2 and a third coupling unit 430-3. The third lower fixing plate 430-1, the third upper fixing plate 430-2 and the third coupling unit 430-3 may be formed of a conductive material. The third lower fixing plate 430-1 is mounted on the third tap supporting portion (not shown) of the left end frame 110 and formed with a coupling groove 430-1h fitted into the guide protrusion (now shown). A bolt (not designated by a reference numeral) is formed to be protruded upward from the third lower fixing plate 430-1. The third upper fixing plate 430-2 is formed with a through-hole (not designated by a reference numeral) through which the bolt (not designated by a reference numeral) of the third lower fixing plate 430-1 passes. A fixing plate connector 430-2c is bonded to the third upper fixing plate 430-2.

Referring to FIG. 12, the third coupling unit 430-3 is installed to an end of the bolt (not designated by a reference numeral) of the third lower fixing plate 430-1. The left electrode tap 310-lt of the first type lithium rechargeable battery 310+1 is disposed between the third lower fixing plate 430-1 and the third upper fixing plate 430-2 and then fixed by the third coupling unit 430-3. At this time, the coupling groove 310-lth of the first type lithium rechargeable battery 310+1 encloses the bolt (not designated by a reference numeral) of the third lower fixing plate 430-1.

Referring to FIG. 12, meanwhile, a dummy electrode tap 430-dt is fixed between the third lower fixing plate 430-1 and the third upper fixing plate 430-2. The dummy electrode tap 430-dt is formed of the same material as the right electrode tap 310-rt of the second type lithium rechargeable battery 310+i. Therefore, a resistance between the third lower fixing plate 430-1 and the third upper fixing plate 430-2 of the third connecting means 430 can be controlled to be equal to that between the first lower fixing plate 410-1 and the first upper fixing plate 410-2 of the first connecting means 410+1.

Referring to FIG. 12, the fixing plate connector 430-2c is electrically connected with the left electrode tap 310-lt of the first type lithium rechargeable battery 310+1 received in the leftmost main frame 130+1 and the dummy electrode tap 430-dt. A connector (not shown) of a zeroth front voltage measuring line (not shown) connected to the voltage measuring device (not shown) is inserted into the fixing plate connector 430-2c. The zeroth front voltage measuring line (not shown) is guided to the fixing plate connector 430-2c of the third connecting means 430 through a gap formed between the small width portion 130-6s of the leftmost main frame 130+1 and the small width portion (not indicated by a reference numeral) of the left end frame 110.

Therefore, referring to FIG. 12, a voltage of the first type lithium rechargeable battery 310+1 received in the leftmost main frame 130+1 can be measured using the zeroth front voltage measuring line (not shown) and the first rear voltage measuring line (not shown). Referring to FIG. 11, a voltage of the second type lithium rechargeable battery 320+n received in the rightmost main frame 130+n can be measured using the n-th front voltage measuring line (not shown) and the n-th rear voltage measuring line (not shown). Referring to FIG. 10, a voltage of the second type lithium rechargeable battery 320+r received in the left main frame 130+r can be measured using the r-th front voltage measuring line (not shown) and the r-th rear voltage measuring line (not shown), and referring to FIG. 10, also a voltage of the first type lithium rechargeable battery 310+(r+1) received in the right main frame 130+(r+1) can be measured using the r-th front voltage measuring line (not shown) and the (r+1)-th rear voltage measuring line (not shown). In this case, since a resistor connected with the first type lithium rechargeable battery 310+1 received in the leftmost main frame 130+1 and the second type lithium rechargeable battery 320+n received in the rightmost main frame 130+n can have the same value by the dummy electrode tap 430-dt as a resistor connected with the rest lithium rechargeable battery, the voltage of each lithium rechargeable battery can be measured under the same conditions.

FIG. 13 is a rear perspective view of a protection cover 500 according to the first embodiment of the present invention. A first protection cover portion 510 fixed to a first protection cover fixing portion 130-9 and a second protection cover portion 520 fixed to a second protection cover fixing portion 230-9 are formed at a rear surface of the protection cover 500.

Referring to FIG. 13, the first protection cover portion 510 includes a first coupling plate 512 comprised of two plates, which the first protection cover fixing portion 130-9 is inserted between. A supporting portion 512-1 supported to an upper end of the first protection cover fixing portion 130-9 is formed between two plates of the first coupling plate 512. Further, one of the two plates of the first coupling plate 512 is formed with a coupling protrusion 512-3 that is inserted into the coupling hole 130-9$h$ of the first protection cover fixing portion 130-9.

FIG. 13 is a rear perspective view of the protection cover according the first embodiment of the present invention.

Referring to FIG. 13, the second protection cover portion 520 includes a second coupling plate 522, and the second coupling plate 522 is formed with a supporting portion 522-1 and a coupling protrusion 522-3.

Since the protection cover 500 is fixed to the first protection cover fixing portion 130-9 and the second protection cover fixing portion 230-9, the first connecting means 410+$i$ mounted on the first tap supporting portion 130-8 and the second connecting means 420+$r$ mounted on the second tap supporting portion 230-8 can be protected without being exposed to the outside.

Meanwhile, in the first embodiment, since the air ventilating hole is formed at the front vertical plate and the rear vertical plate of each main frame, air can be flowed between the first type lithium rechargeable battery and the second type lithium rechargeable battery received in each main frame, and thus it is prevented that the lithium rechargeable battery is damaged by heat generated upon charge and discharge.

In addition, in the first embodiment, the lithium rechargeable battery may be not provided at the left space portion and the right space portion of a certain main frame arranged between the leftmost main frame and the rightmost main frame. In this case, the right electrode tap of the second type lithium rechargeable battery received in the main frame adjacent to the left side of the certain main frame and the left electrode tap of the first type lithium rechargeable battery received in the main frame adjacent to the right side of the certain main frame are electrically connected by a L-shaped first bus bar (not shown) and a L-shaped second bus bar (not shown). One end of the first bus bar and one end of the second bus bar substitutes respectively the upper fixing plate of the second connecting means, and thus they can be electrically connected to the right electrode tap of the second type lithium rechargeable battery and the left electrode tap of the first type lithium rechargeable battery, respectively. The other end of the first bus bar and the other end of the second bus bar are connected to each other through a current breaking device like a fuse in order to cut off current when over-current flows. At this time, middle portions of the first and second bus bars are guided by the bus bar guiding portion.

Second Embodiment

The second embodiment is another embodiment of the unit set having a plurality of lithium rechargeable batteries according to the present invention.

FIG. 14 is an exploded perspective view of the lithium rechargeable battery received in a main frame according to a second embodiment of the present invention.

Referring to FIG. 14, in the embodiment, unlike the first embodiment, the left space portion of the main frame 130+$i$ receives a plurality of first type lithium rechargeable batteries 310+$i$, and the right space portion of the main frame 130+$i$ receives a plurality of second type lithium rechargeable batteries 320+$i$. The first type lithium rechargeable batteries 310+$i$ and the second type lithium rechargeable batteries 320+$i$ are received by m, respectively.

FIG. 15 is a front view showing a stacked status of the right electrode tap 310-$rt$ of the first type lithium rechargeable battery 310+$i$ and the left electrode tap 320-$lt$ of the second type lithium rechargeable battery 320+$i$ which are received in the main frame 130+I according to the second embodiment of the present invention.

Referring to FIGS. 14 and 15, the right electrode taps 310-$rt$ of the first type lithium rechargeable batteries 310+$i$ are stacked up and down to be electrically connected in parallel to each other, and the left electrode taps 320-$lt$ of the second type lithium rechargeable batteries 320+$i$ are stacked up and down to be electrically connected in parallel to each other.

FIG. 16 is a front view showing a coupled status of the right electrode tap 310-$rt$ of the first type lithium rechargeable battery 310+$i$ and the left electrode tap 320-$lt$ of the second type lithium rechargeable battery 320+$i$ which are received in the main frame 130+$i$ according to the second embodiment of the present invention. Referring to FIGS. 14 and 16, the right electrode taps 310-$rt$ of the plurality of first type lithium rechargeable batteries 310+$i$ received in the main frame 130+$i$ and the left electrode taps 320-$lt$ of the plurality of second type lithium rechargeable battery 320+$i$ received in the main frame 130+$i$ are electrically connected in series to each other through the first connecting means 410+$i$. Like in the first embodiment, the right electrode tap 310-$rt$ and the left electrode tap 320-$lt$ are respectively formed with a coupling hole (not shown) instead of the coupling groove (not shown).

Although not shown in the drawings, in the same way, the right electrode taps of the second type lithium rechargeable batteries received in the left main frame of the adjacent main frames are stacked up and down to be electrically connected in parallel to each other, and the left electrode taps of the first type lithium rechargeable batteries received in the right main frame of the adjacent main frames are stacked up and down to be electrically connected in parallel to each other. And then they are electrically connected in series to each other through the second connecting means.

Although not shown in the drawings, in the second embodiment, the dummy electrode tap is fixedly disposed between the fourth lower fixing plate and the fourth upper fixing plate of the fourth connecting means that fixes the right electrode tap of the second lithium rechargeable battery received in the rightmost main frame. The number of the dummy electrode taps fixed between the fourth lower fixing plate and the fourth upper fixing plate of the fourth connecting means is the same as the number of the first type lithium rechargeable batteries and the number of the second type lithium rechargeable batteries received in each main frame. The dummy electrode taps are fixedly stacked up and down. In the same way, the dummy electrode tap is fixedly disposed between the third lower fixing plate and the third upper fixing plate of the third connecting means that fixes the left electrode tap of the first lithium rechargeable battery received in the leftmost main frame. The number of the dummy electrode taps fixed between the third lower fixing plate and the third upper fixing plate of the third connecting means is the same as the number of the first type lithium rechargeable batteries and the number of the second type lithium rechargeable batteries received in each main frame. The dummy electrode taps are fixedly stacked up and down.

Therefore, in case of the second embodiment, the plurality of the lithium rechargeable batteries are installed in each main frame, and the installing structure of the lithium rechargeable batteries is mPnS type, wherein P means that the lithium rechargeable batteries in one set, which are received in the same space portion of the same main frame, are connected in parallel to each other, m is the number of the lithium rechargeable batteries received in the same space portion of the same main frame and connected in parallel to each other, S means that the lithium rechargeable batteries in one set, which are received in the difference space portion, are connected in series to each other, and n is the number of battery sets that are connected in series to each other. For example, in case of 2P50S, it means that 50 battery sets are connected in series to each other, and each battery set has two lithium rechargeable batteries that are connected in parallel. That is, the number of total main frames is 25, the number of total space portions (i.e., the number of the left space portions and the right space portions) is 50, two lithium rechargeable batteries connected in parallel to each other are received in each space portion, and the number of total lithium rechargeable batteries is 100. Therefore, in the second embodiment, a capacity can be controlled by changing m, and a voltage can be easily controlled by changing n.

In the second embodiment, as the number of the first type lithium rechargeable batteries and the second type lithium rechargeable batteries received in each main frame is increased, a width between the left end and the right end of each main frame becomes wider.

Since the second embodiment is the same as the first embodiment, except that the number of the first type lithium rechargeable batteries and the second type lithium rechargeable batteries is n, the description thereof will be omitted.

Third Embodiment

The third embodiment is yet another embodiment of the unit set having a plurality of lithium rechargeable batteries according to the present invention.

FIG. 17 is a perspective view showing a status that an upper housing is separated according to a third embodiment of the present invention.

Referring to FIG. 17, the third embodiment has the unit set of the first or second embodiment of the present invention. The unit set 1000 having the plurality of lithium rechargeable batteries according to the first or second embodiment of the present invention is installed in a lithium rechargeable battery housing (not indicated by a reference numeral).

Referring to FIG. 17, the lithium rechargeable battery housing (not indicated by a reference numeral) includes a lower housing 610 and an upper housing 620. The upper housing 620 is formed with an air inlet hole 622 and an air outlet hole 624.

Referring to FIG. 17, the air inlet hole 622 is formed on an extension line of a front air path (not shown) formed between an inner surface of the upper housing 620 and the front vertical plate 130-2 of each main frame (not indicated by a reference numeral).

Referring to FIG. 17, the air outlet hole 624 is formed on an extension line of a rear air path (not shown) formed between the inner surface of the upper housing 620 and the rear vertical plate (not shown) of each main frame (not indicated by a reference numeral).

Referring to FIG. 17, an air blowing fan (not shown) is disposed at a left side of the air inlet hole 622 so as to blow cooling air. Therefore, the cooling air generated by the air blowing fan (not shown) is introduced into the housing (not indicated by a reference numeral) through the air inlet hole 622, flowed through the front air path (not shown) and the rear air path (not shown) and then exhausted through the air outlet hole 624. At this time, part of the cooling air passing through the front air path (not shown) is introduced through the air ventilating hole 130-2h of the front vertical plate 130-2 and then exhausted through the air ventilating hole (not shown) of the rear vertical plate (not shown), thereby preventing overheat of the first type lithium rechargeable battery and the second type lithium rechargeable battery received in each main frame.

Fourth Embodiment

The fourth embodiment is yet another embodiment of the unit set having a plurality of lithium rechargeable batteries according to the present invention.

FIG. 18 is a perspective view of an upper housing 620 of the lithium rechargeable battery housing according to a fourth embodiment of the present invention. The fourth embodiment is the same as the third embodiment, except the number of air inlet holes 622 and air outlet holes 624 formed at the upper housing 620.

Referring to FIG. 18, the air inlet hole 622 is formed on an extension line of the front air path (not shown) formed between an inner surface of the upper housing 620 and the front vertical plate 130-2 (referring to FIG. 17) of each main frame (not indicated by a reference numeral) in the same way as in the third embodiment. However, unlike in the third embodiment, the air inlet hole 622 is formed at a left surface and a right surface of the upper housing 620 on the extension line of the front air path (not shown). Although not shown in the drawing, an air blowing fan (not shown) is provided outside each air inlet hole 622.

Referring to FIG. 18, the air outlet hole 624 is formed on an extension line of the rear air path (not shown) formed between the inner surface of the upper housing 620 and the rear vertical plate (not shown) of each main frame (not indicated by a reference numeral) in the same way as in the third embodiment. However, unlike in the third embodiment, the air outlet hole 624 is formed at the left surface and the right surface of the upper housing 620 on the extension line of the rear air path (not shown).

The fourth embodiment is the same as the third embodiment, except the ventilation path. Therefore, the description thereof will be omitted.

Fifth Embodiment

The fifth embodiment is yet another embodiment of the unit set having a plurality of lithium rechargeable batteries according to the present invention.

FIG. 19 is a perspective view of an upper housing 620 of the lithium rechargeable battery housing according to a fifth embodiment of the present invention. The fifth embodiment is the same as the third embodiment, except the air inlet hole 622 and the air outlet hole 624.

Referring to FIG. 19, the air inlet hole 622 is formed at a front surface of the upper housing 620. Referring to FIGS. 17 and 19, the air inlet hole 622 is a single through-hole that is formed from a front portion of the air ventilating hole 130-2h formed at the front vertical plate 130-2 of the leftmost main frame (not indicated by a reference numeral) to a front portion of the air ventilating hole 130-2h formed at the front vertical plate 130-2 of the rightmost main frame (not indicated by a reference numeral). Although not shown in the drawing, an air blowing fan (not shown) is provided at a front portion of the air inlet hole 622.

Referring to FIG. 19, the air outlet hole 624 is formed at a rear surface of the upper housing 620 to be opposed to the air inlet hole 622, and also the air outlet hole 624 has the same shape as the air inlet hole 622.

The fifth embodiment is the same as the third embodiment, except the ventilation path. Therefore, the description thereof will be omitted.

Sixth Embodiment

The sixth embodiment relates to an embodiment of a set having a plurality of the unit sets according to the present invention.

FIG. 20 is a perspective view showing a status that the upper housing is separated according to a sixth embodiment of the present invention, and FIG. 21 is a schematic view of a ventilation path according to the sixth embodiment of the present invention.

Referring to FIG. 20, the sixth embodiment has the unit set 1000 of the first or second embodiment of the present invention. The unit set 1000 of the first or second embodiment is installed in a lithium rechargeable battery housing (not indicated by a reference numeral). The unit set 1000 of the first or second embodiment may be provided in plural to be adjacent to each other. In the embodiment, for example, two unit sets are provided.

Referring to FIG. 20, an rear end of the rear spacing protrusion 130-7 of a front unit set 1000+*f* is contacted with a front end of the front spacing protrusion 130-6 of a rear unit set 1000+*r*, and thus a central air path 1002 is formed between a rear vertical plate (not shown) of the front unit set 1000+*f* and a front vertical plate (not indicated by a reference numeral) of the rear unit set 1000+*r*.

Referring to FIG. 20, the lithium rechargeable battery housing (not indicated by a reference numeral) includes a lower housing 1610 and an upper housing 1620. The upper housing 1620 is formed with an air inlet hole 1622 and an air outlet hole 1624-*f*, 1624-*r*.

Referring to FIG. 20, the air inlet hole 1622 is formed on an extension line of the central air path 1002 formed between the rear vertical plates (not shown) of the front unit set 1000+*f* and the front vertical plates (not indicated by a reference numeral) of the rear unit set 1000+*r*.

Referring to FIG. 20, the air outlet hole 1624-*f* is formed on an extension line of a front air path 1004-*f* (Referring to FIG. 21) formed between an inner surface of the upper housing 1620 and front vertical plates of main frames (not indicated by a reference numeral) forming the front unit set 1000+*f*. The air outlet hole 1624-*r* is formed on an extension line of a rear air path 1004-*r* (Referring to FIG. 21) formed between the inner surface of the upper housing 1620 and rear vertical plates (not shown) of main frames (not indicated by a reference numeral) forming the front unit set 1000+*r*.

Referring to FIG. 20, an air blowing fan (not shown) is disposed at a left side of the air inlet hole 1622 so as to blow cooling air. Therefore, the cooling air guided from the air blowing fan (not shown) is introduced in the lithium rechargeable battery housing (not indicated by a reference numeral) through the air inlet hole 1622, flowed through the central air path 1002, the front air path 1004-*f* (Referring to FIG. 21) and the rear air path 1004-*r* (Referring to FIG. 21) and then exhausted through the air outlet hole 1624-*f*, 1624-*r*. Referring to FIGS. 20 and 21, part of the cooling air passing through the central air path 1002 is introduced into the air ventilating hole 130-2*h* of the front unit set 1000+*f* and the air ventilating hole 130-2*h* of the rear unit set 1000+*r* and then exhausted through the air ventilating hole 130-2*h* of the front unit set 1000+*f* and the air ventilating hole 130-3*h* of the rear unit set 1000+*r*.

Seventh Embodiment

The seventh embodiment relates to another embodiment of the set having a plurality of the unit sets according to the present invention.

FIG. 22*a* is a perspective view of an upper housing according to a seventh embodiment of the present invention. The seventh embodiment is the same as the sixth embodiment, except the air inlet hole 1622 and the air outlet hole 1624-*f*, 1624-*r*.

Referring to FIGS. 20 and 22*a*, the seventh embodiment like the sixth embodiment has the unit set 1000 of the first or second embodiment of the present invention. The unit set 1000 of the first or second embodiment is installed in a lithium rechargeable battery housing (not indicated by a reference numeral). The unit set 1000 of the first or second embodiment may be provided in plural to be adjacent to each other, like in the sixth embodiment. In the embodiment, for example, two unit sets are provided to be adjacent to each other.

Referring to FIG. 22*a*, the upper housing 1620 is formed with an air inlet hole 1622 and an air outlet hole 1624-*f*, 1624-*r*.

Referring to FIGS. 20 and 22*a*, as like in the sixth embodiment, the air inlet hole 1622 is formed on an extension line of a central air path 1002 formed between the rear vertical plates (not shown) of the front unit set 1000+*f* and the front vertical plates (not indicated by a reference numeral) of the rear unit set 1000+*r*. However, unlike in sixth embodiment, the air inlet hole 1622 is formed at each left and right surface of the upper housing 1620 on the extension line of the central air path 1002. Although not shown in the drawing, an air blowing fan (not shown) is disposed at an outside of the air inlet hole 1622 so as to blow cooling air.

Referring to FIGS. 20 and 22*a*, as like in the sixth embodiment, the air outlet hole 1624-*f* is formed on an extension line of a front air path 1004-*f* (Referring to FIG. 22*b*) formed between an inner surface of the upper housing 1620 and front vertical plates 130-2 of main frames (not indicated by a reference numeral) forming the front unit set 1000+*f*. However, unlike in sixth embodiment, the air outlet hole 1624-*f* is formed at each left and right surface of the upper housing 1620 on the extension line of the front air path 1004-*f* (Referring to FIG. 22*b*).

Referring to FIGS. 20 and 22*a*, as like in the sixth embodiment, the air outlet hole 1624-*r* is formed on an extension line of a rear air path 1004-*r* (Referring to FIG. 22*b*) formed between the inner surface of the upper housing 1620 and rear vertical plates (not shown) of main frames (not indicated by a reference numeral) forming the front unit set 1000+*r*. However, unlike in the sixth embodiment, the air outlet hole 1624-*r* is formed at each left and right surface of the upper housing 1620 on the extension line of the central air path 1002.

FIG. 22*b* is a schematic view of a ventilation path according to the seventh embodiment of the rear air path 1004-*r* (Referring to FIG. 22*b*).

Eighth Embodiment

The eighth embodiment relates to yet another embodiment of the set having a plurality of the unit sets according to the present invention.

FIG. 23a is a perspective view of an upper housing according to an eighth embodiment of the present invention. The eighth embodiment is the same as the sixth embodiment, except the air inlet hole 1622 and the air outlet hole 1624.

Referring to FIGS. 20 and 23a, the eighth embodiment like the sixth embodiment has the unit set 1000 of the first or second embodiment of the present invention, and the unit set 1000 of the first or second embodiment is installed in a lithium rechargeable battery housing (not indicated by a reference numeral). The unit set 1000 of the first or second embodiment may be provided in plural to be adjacent to each other, like in the sixth embodiment. In the embodiment, for example, two unit sets are provided to be adjacent to each other.

Referring to FIG. 23a, the upper housing 1620 is formed with an air inlet hole 1622 and an air outlet hole 1624.

Referring to FIGS. 20 and 23a, the air inlet hole 1622 is formed on an extension line of a front air path 1004-$f$ (Referring to FIG. 23b) formed between an inner surface of the upper housing 1620 and front vertical plates 130-2 of main frames (not indicated by a reference numeral) forming the front unit set 1000+$f$. The air inlet hole 1622 is formed at each left and right surface of the upper housing 1620 on the extension line of the front air path 1004-$f$ (Referring to FIG. 23b). Although not shown in the drawing, an air blowing fan (not shown) is disposed at an outside of each air inlet hole 1622 so as to blow cooling air.

Referring to FIGS. 20 and 23a, the air outlet hole 1624 is formed on an extension line of a rear air path 1004-$r$ (Referring to FIG. 23b) formed between the inner surface of the upper housing 1620 and rear vertical plates (not shown) of main frames (not indicated by a reference numeral) forming the rear unit set 1000+$r$. The air outlet hole 1624 is formed at each left and right surface of the upper housing 1620 on the extension line of the rear air path 1004-$r$ (Referring to FIG. 23b).

FIG. 23b is a schematic view of a ventilation path according to the eighth embodiment of the present invention.

Ninth Embodiment

The ninth embodiment relates to yet another embodiment of the set having a plurality of the unit sets according to the present invention.

FIG. 24a is a perspective view of an upper housing according to a ninth embodiment of the present invention. The ninth embodiment is the same as the sixth embodiment, except the air inlet hole 1622 and the air outlet hole 1624.

Referring to FIGS. 20 and 24a, the ninth embodiment like the sixth embodiment has the unit set 1000 of the first or second embodiment of the present invention, and the unit set 1000 of the first or second embodiment is installed in a lithium rechargeable battery housing (not indicated by a reference numeral). The unit set 1000 of the first or second embodiment may be provided in plural to be adjacent to each other, like in the sixth embodiment. In the embodiment, for example, two unit sets are provided to be adjacent to each other.

Referring to FIG. 24a, the upper housing 1620 is formed with an air inlet hole 1622 and an air outlet hole 1624.

Referring to FIG. 24a, the air inlet hole 1622 is provided in plural at a front surface of the upper housing 1620. Each air inlet hole 1622 is formed at a front side of the air ventilating hole 130-2$h$ (Referring to FIG. 24b) formed at each front vertical plate of a front-most unit set. Although not shown in the drawing, an air blowing fan (not shown) is disposed at an outside of each air inlet hole 1622 so as to blow cooling air.

Referring to FIG. 24a, the air outlet hole 1624 is provided in the same number as the air inlet hole 1622 to be respectively opposed to the air inlet holes 1622.

FIG. 24b is a schematic view of a ventilation path according to the ninth embodiment of the present invention.

Meanwhile, the air inlet hole 1622 may be formed into a single through-hole that is formed from a front portion of the air ventilating hole 130-2$h$ formed at the front vertical plate of the leftmost main frame (not indicated by a reference numeral) to a front portion of the air ventilating hole 130-2$h$ formed at the front vertical plate 130-2 of the rightmost main frame (not indicated by a reference numeral) of the front main frame (not indicated by a reference numeral), as shown FIG. 19.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

According to the present invention, since the connection structure of the plurality of lithium rechargeable batteries is unrestricted, it is possible to freely change the voltage and the capacity of the connected lithium rechargeable batteries. Further, since the present invention has the excellent heat radiation performance, it is possible to minimize the heat generated upon the charge/discharge. Thus, it can be used in various industrial fields including the hybrid vehicle necessary for the high power.

The invention claimed is:

1. A unit set having a plurality of lithium rechargeable batteries, comprising:
    a left end frame and a right end frame;
    a plurality of main frames which are arranged to be adjacent to each other between the left end frame and the right end frame, and which respectively have a first tap supporting portion formed at an upper end thereof to be exposed, a left space portion formed at a lower left side of the first tap supporting portion to be opened and a right space portion formed at a lower right side of the first tap supporting portion to be opened;
    a center frame which has a first tap supporting portion formed at an upper end thereof to be exposed, and of which a left side is coupled to a left main frame and a right side is coupled to a right main frame so as to be disposed between the right space portion of the left main frame and the left space portion of the right main frame of the two adjacent main frames;
    a first type lithium rechargeable battery which is formed with a left electrode tap bent to a left side of an outer circumferential surface of a pouch and a right electrode tap bent to a right side of the outer circumferential surface of the pouch and which is received in the left space portion of each main frame;
    a second type lithium rechargeable battery of which a left electrode tap having an opposite polarity of the right electrode tap of the first type lithium rechargeable battery is protruded in a direction opposed to the right electrode tap of the first type lithium rechargeable battery and a right electrode tap having an opposite polarity of the left electrode tap of the first type lithium rechargeable battery is protruded in a direction opposed to the left electrode tap of the first type lithium rechargeable battery, and which is received in the right space portion of each main frame;
a first connecting means which is provided with a first lower fixing plate having a bolt protruded upward, a first upper fixing plate through which the bolt of the first lower fixing plate passes and a first coupling unit installed to an end of the bolt of the first lower fixing plate passing through the first upper fixing plate, and which is disposed at the first tap supporting portion; and
a second connecting means which is provided with a second lower fixing plate having a bolt protruded upward, a second upper fixing plate through which the bolt of the second lower fixing plate passes and a second coupling unit installed to an end of the bolt of the second lower fixing plate passing through the second upper fixing plate, and which is disposed at the second tap supporting portion,
wherein the right electrode tap of the first type lithium rechargeable battery and the left electrode tap of the second type lithium rechargeable battery received in one of the main frames are fixedly and electrically connected to each other in series by the first connecting means, and the right electrode tap of the second type lithium rechargeable battery received in the left main frame and the left electrode tap of the first type lithium rechargeable battery received in the right main frame of the two adjacent main frames are fixedly and electrically connected to each other in series by the second connecting means.

2. The unit set according to claim 1, wherein n first type lithium rechargeable batteries are received in the left space portion of each main frame to be electrically connected to each other in parallel, and n second type lithium rechargeable batteries are received in the right space portion of each main frame to be electrically connected to each other in parallel, where n is a natural number that is equal to and larger more than 2.

3. The unit set according to claim 2, wherein left electrode taps and right electrode taps of the n first type lithium rechargeable batteries received in the left space portion of each main frame are stacked up and down to be electrically connected to each other in parallel, and left electrode taps and right electrode taps of n second type lithium rechargeable batteries received in the right space portion of each main frame are stacked up and down to be electrically connected to each other in parallel.

4. The unit set according to claim 1, wherein the left end frame has a third tap supporting portion formed an upper end thereof to be exposed and is coupled to a leftmost main frame of the main frames,
the right end frame has a fourth tap supporting portion formed an upper end thereof to be exposed and is coupled to a rightmost main frame of the main frames,
a third connecting means which is provided with a third lower fixing plate having a bolt protruded upward, a third upper fixing plate through which the bolt of the third lower fixing plate passes and a third coupling unit installed to an end of the bolt of the third lower fixing plate passing through the third upper fixing plate is disposed at the third tap supporting portion,
a fourth connecting means which is provided with a fourth lower fixing plate having a bolt protruded upward, a fourth upper fixing plate through which the bolt of the fourth lower fixing plate passes and a fourth coupling unit installed to an end of the bolt of the fourth lower fixing plate passing through the fourth upper fixing plate is disposed at the fourth tap supporting portion,
the third connecting means fixes the left electrode tap of the first type lithium rechargeable battery received in the leftmost main frame of the main frames between the third lower fixing plate and the third upper fixing plate, and
the fourth connecting means fixes the right electrode tap of the second type lithium rechargeable battery received in the rightmost main frame of the main frames between the fourth lower fixing plate and the fourth upper fixing plate.

5. The unit set according to claim 4, wherein a fixing plate connector is bonded to each of the first upper fixing plate, the second upper fixing plate, the third upper fixing plate and the fourth upper fixing plate, and a connector of a voltage measuring line connected to a voltage measuring device is inserted into each of the fixing plate connectors.

6. The unit set according to claim 5, wherein a dummy electrode tap formed of the same material as the right electrode tap of the second type lithium rechargeable battery is fixed between the third lower fixing plate and the third upper fixing plate, and a dummy electrode tap formed of the same material as the left electrode tap of the first type lithium rechargeable battery is fixed between the fourth lower fixing plate and the fourth upper fixing plate.

7. The unit set according to claim 1, further comprising a protection cover which is disposed at an upper side of each first and second connecting means,
wherein a first protection cover fixing portion on which the protection cover is installed is formed at an upper end of each main frame on a horizontal extension line of the first tap supporting portion, and a second protection cover fixing portion on which the protection cover is installed is formed at an upper end of each main frame on a horizontal extension line of the second tap supporting portion.

8. The unit set according to claim 1, wherein the each of the main frames comprises a straight bottom plate, a front vertical plate disposed upward at a front end of the bottom plate and having an air ventilating hole formed at a center portion thereof, a rear vertical plate disposed upward at a rear end of the bottom plate and having an air ventilating hole formed at a center portion thereof, a front spacing protrusion protruded forward at an upper side of the front vertical plate, and a rear spacing protrusion protruded backward at an upper side of the rear vertical plate, and
each of the front spacing protrusion and the rear spacing protrusion is formed with an installing groove recessed from an upper end thereof so as to receive a straight tube in a transverse direction.

9. The unit set according to claim 8, wherein each of the front vertical plate and the rear vertical plate is formed with a left groove and a right groove that are respectively formed to be recessed from left and right ends thereof to a center portion thereof, and
the center frame has a front temperature sensor inserting groove recessed from a front outer surface thereof to an inside thereof, passing through left and right surfaces thereof and communicated with a through-hole defined by the right groove of the front vertical plate of the left main frame and the left groove of the front vertical plate of the right main frame of the two adjacent main frames, and
a rear temperature sensor inserting groove recessed from a rear outer surface thereof to an inside thereof, passing through left and right surfaces thereof and communicated with a through-hole defined by the right groove of the rear vertical plate of the left main frame and the left groove of the rear vertical plate of the right main frame of the two adjacent main frames.

10. The unit set according to claim 9, wherein the front spacing protrusion has a small width portion formed at a rear side thereof, and a large width portion linked with the small width portion and formed at a front side thereof to be more protruded in a transverse direction than the small width portion,
the rear spacing protrusion has a small width portion formed at a front side thereof and a large width portion linked with the small width portion and formed at a rear side thereof to be more protruded in a transverse direction than the small width portion,
a part of the installing groove of the front spacing protrusion is formed at the small width portion of the front spacing protrusion, and the rest part thereof is formed at the large width portion of the front spacing protrusion,
a part of the installing groove of the rear spacing protrusion is formed at the small width portion of the rear spacing protrusion, and the rest part thereof is formed at the large width portion of the rear spacing protrusion,
a temperature measuring line connected to a temperature measuring device, which is guided through a gap formed between the small width portion of the front spacing protrusion of the left main frame and the small width portion of the front spacing protrusion of the right main frame of the two adjacent main frames, is connected to a temperature sensor inserted into the front temperature sensor inserting groove, and
a temperature measuring line connected to the temperature measuring device, which is guided through a gap formed between the small width portion of the rear spacing protrusion of the left main frame and the small width portion of the rear spacing protrusion of the right main frame of the two adjacent main frames, is connected to a temperature sensor inserted into the rear temperature sensor inserting groove.

11. The unit set according to claim 8, wherein the front spacing protrusion has a small width portion formed at a rear side thereof, and a large width portion linked with the small width portion and formed at a front side thereof to be more protruded in a transverse direction than the small width portion,
the rear spacing protrusion has a small width portion formed at a front side thereof and a large width portion linked with the small width portion and formed at a rear side thereof to be more protruded in a transverse direction than the small width portion,
a part of the installing groove of the front spacing protrusion is formed at the small width portion of the front spacing protrusion, and the rest part thereof is formed at the large width portion of the front spacing protrusion,
a part of the installing groove of the rear spacing protrusion is formed at the small width portion of the rear spacing protrusion, and the rest part thereof is formed at the large width portion of the rear spacing protrusion,
a voltage measuring line guided through a gap formed between the small width portion of the front spacing protrusion of the left main frame and the small width portion of the front spacing protrusion of the right main frame of the two adjacent main frames, is electrically connected to the second connecting means, and
a voltage measuring line guided through a gap formed between the small width portion of the rear spacing protrusion of the left main frame and the small width portion of the rear spacing protrusion of the right main frame of the two adjacent main frames, is electrically connected to the first connecting means.

12. The unit set according to claim 8, further comprising a lithium rechargeable battery housing enclosing the unit set having a plurality of lithium rechargeable batteries and formed with an air inlet hole and an air outlet hole,
wherein the air inlet hole is formed on one of an extension line of a front air path formed between an inner surface of the housing and the front vertical plate and an extension line of a rear air path formed between the inner surface of the housing and the rear vertical plate, and
the air outlet hole is formed on the other of an extension line of a front air path formed between an inner surface of the housing and the front vertical plate and an extension line of a rear air path formed between the inner surface of the housing and the rear vertical plate.

13. The unit set according to claim 8, further comprising a lithium rechargeable battery housing enclosing the unit set having a plurality of lithium rechargeable batteries and formed with an air inlet hole and an air outlet hole,
wherein the air inlet hole is formed at one of a front surface and a rear surface of the housing, and
the air outlet hole is formed at the other of a front surface and a rear surface of the housing.

14. A set having a plurality of unit sets which respectively have a plurality of lithium rechargeable batteries, comprising:
a plurality of unit sets according to claim 8, which are adjacent to each other;
a lithium rechargeable battery housing enclosing the plurality of unit sets having a plurality of lithium rechargeable batteries and formed with an air inlet hole and an air outlet hole;
wherein a rear end of a rear spacing protrusion of a front unit set of the two adjacent unit sets is connected to a front end of a front spacing protrusion of a rear unit set of the two adjacent unit sets, and
the air inlet hole and the air outlet hole are formed on at least one of an extension line of a front air path formed between an inner surface of the housing and a front vertical plate of a front-most unit set of the unit sets, an extension line of a rear air path formed between the inner surface of the housing and a rear vertical plate of a rear-most unit set of the unit sets, and an extension line of a central air path formed between the rear vertical plate and the front vertical plate of the two adjacent unit sets.

15. A set having a plurality of unit sets which respectively have a plurality of lithium rechargeable batteries, comprising:
a plurality of unit sets according to claim 8, which are adjacent to each other;
a lithium rechargeable battery housing enclosing the plurality of unit sets having a plurality of lithium rechargeable batteries and formed with an air inlet hole and an air outlet hole;
wherein a rear end of a rear spacing protrusion of a front unit set of the two adjacent unit sets is connected to a front end of a front spacing protrusion of a rear unit set of the two adjacent unit sets, and
the air inlet hole is formed at one of a front surface and a rear surface of the housing, and
the air outlet hole is formed at the other of a front surface and a rear surface of the housing.

16. The set having a plurality of unit sets according to claim 15, wherein the air inlet hole is provided in plural, and each air inlet hole is formed at a front side of the air ventilating hole formed at each front vertical plate of a front-most unit set of the unit sets, and
the air outlet hole is provided in plural, and each air outlet hole is formed at a rear side of the air ventilating hole formed at each rear vertical plate of a rear-most unit set of the unit sets.

* * * * *